(12) United States Patent
Miyanaga

(10) Patent No.: US 9,232,113 B2
(45) Date of Patent: Jan. 5, 2016

(54) APPARATUS, METHOD, AND NON-TRANSITORY COMPUTER-READABLE RECORDING MEDIUM FOR IMAGE FORMING THAT CREATE HIGHLY ACCURATE COLOR CONVERSION TABLE

(71) Applicant: Kyocera Document Solutions Inc., Osaka (JP)

(72) Inventor: Yuka Miyanaga, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/529,156

(22) Filed: Oct. 31, 2014

(65) Prior Publication Data

US 2015/0116740 A1    Apr. 30, 2015

(30) Foreign Application Priority Data

Oct. 31, 2013   (JP) ................................. 2013-226609

(51) Int. Cl.
*H04N 1/60* (2006.01)
*G06K 15/02* (2006.01)

(52) U.S. Cl.
CPC .......... *H04N 1/6008* (2013.01); *G06K 15/1878* (2013.01); *H04N 1/6019* (2013.01); *H04N 2201/0094* (2013.01)

(58) Field of Classification Search
USPC .................... 358/1.9, 523, 518; 382/167, 162
See application file for complete search history.

(56) References Cited

U.S. PATENT DOCUMENTS

| 6,415,065 | B1 | 7/2002 | Miyake |
| 2003/0002061 | A1* | 1/2003 | Van de Capelle ............... 358/1.9 |
| 2004/0212817 | A1* | 10/2004 | Hagai et al. .................... 358/1.9 |

FOREIGN PATENT DOCUMENTS

JP         H09-261499 A      10/1997

* cited by examiner

*Primary Examiner* — Quang N Vo
(74) *Attorney, Agent, or Firm* — James W. Judge

(57) ABSTRACT

An image forming apparatus includes an interpolation reference data creating unit, a reference space coordinate calculating unit, an interpolation operation unit, and a color conversion unit. The interpolation reference data creating unit divides a hue plane with grid points and creates interpolation reference data where triangular shapes formed by the grid points for an linear interpolation are varied in portions where saturation of the hue plane is equal to or less than a predetermined threshold and where the saturation of the hue plane is higher than the predetermined threshold. The interpolation operation unit performs the linear interpolation with the coordinates of the triangular shapes formed by the grid points in the hue plane adjacent to the coordinates calculated by the reference space coordinate calculating unit so as to create the color conversion table. The color conversion unit converts a color value with the color conversion table.

3 Claims, 20 Drawing Sheets

FIG. 3A
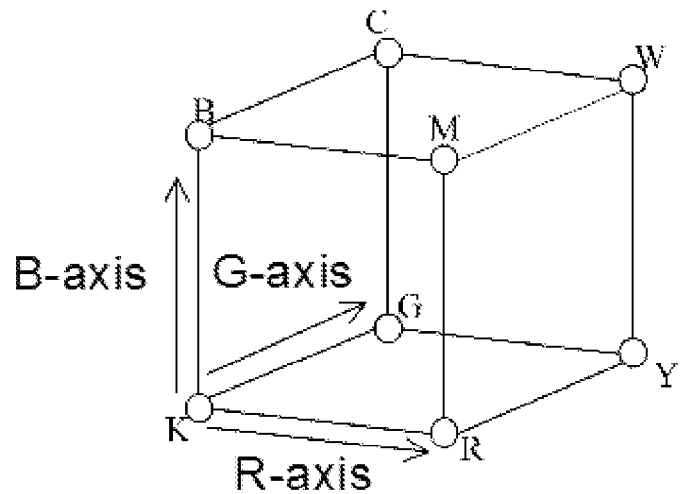
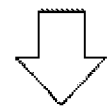
FIG. 3B
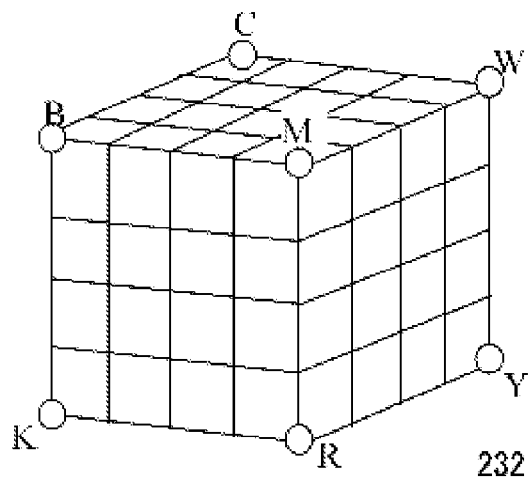

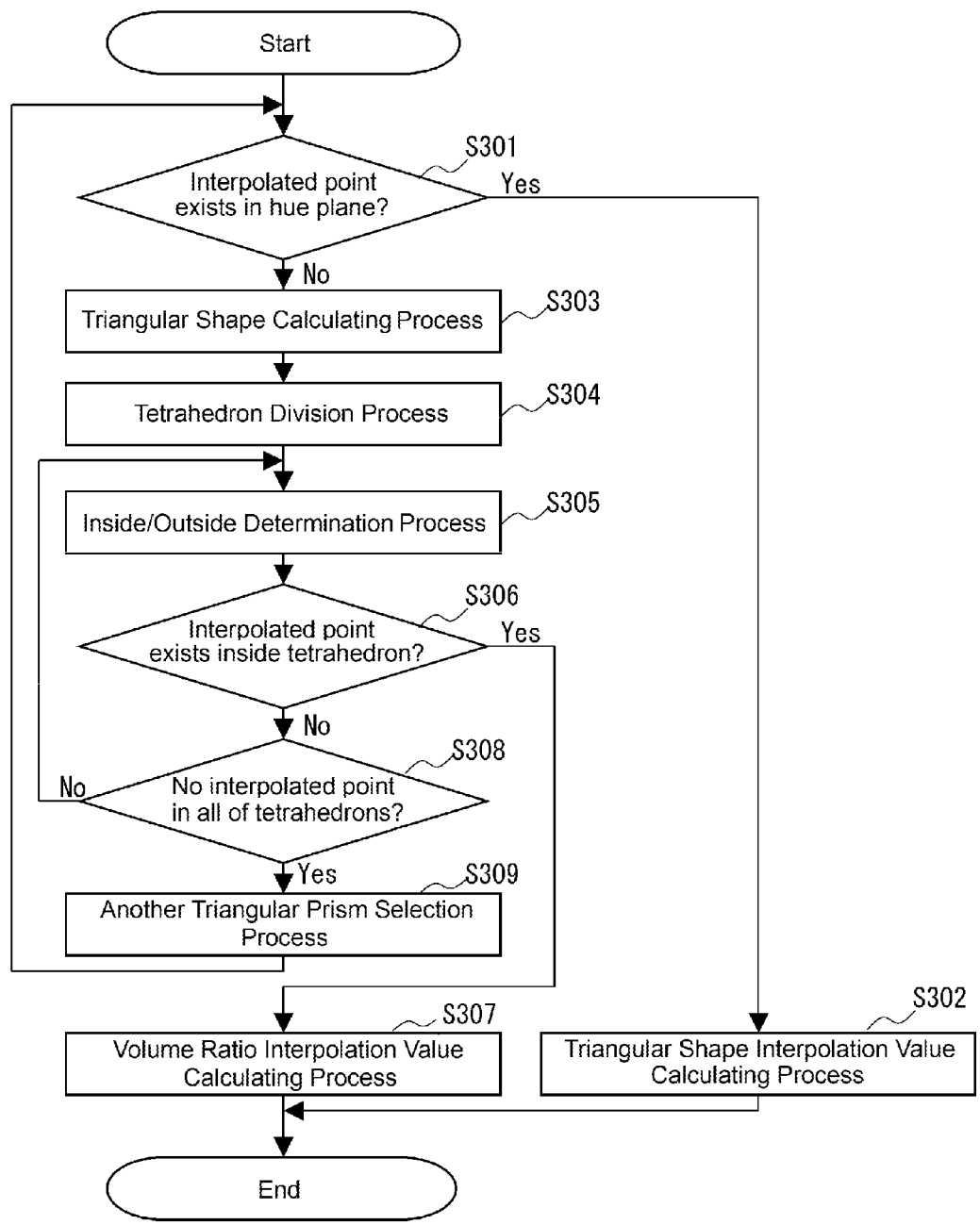

202

203

Shape α

Shape γ

Shape δ

APPARATUS, METHOD, AND NON-TRANSITORY COMPUTER-READABLE RECORDING MEDIUM FOR IMAGE FORMING THAT CREATE HIGHLY ACCURATE COLOR CONVERSION TABLE

INCORPORATION BY REFERENCE

This application is based upon, and claims the benefit of priority from, corresponding Japanese Patent Application No. 2013-226609 filed in the Japan Patent Office on Oct. 31, 2013, the entire contents of which are incorporated herein by reference.

BACKGROUND

Unless otherwise indicated herein, the description in this section is not prior art to the claims in this application and is not admitted to be prior art by inclusion in this section.

There is provided an image forming apparatus such as a Multi-Functional Peripheral (MFP) that can print a document and an image. A color value in a RGB (Red, Green, and Blue) color space is used for general print data of an image forming apparatus. In contrast to this, the color value in a CMYK (Cyan, Magenta, Yellow, black, or Key plate) color space is often used in outputting to recording sheets in the image forming apparatus. In view of this, the image forming apparatus is required to perform a color conversion from the color value in the RGB color space into the color value in the CMYK color space for image formation.

There exist simple conversion equations for the color conversion from the RGB color space into the CMYK color space.

$$C=(1-R-K)/(1-K)$$

$$M=(1-G-K)/(1-K)$$

$$Y=(1-B-K)/(1-K)$$

$$K=\min(1-R,1-G,1-B)$$

However, performing the color conversion accurately using the above-described equations is difficult for the model dependent CMYK color space. In view of this, a color conversion table (LUT, Lookup Table) is used for the color conversion from the RGB color space into the CMYK color space. In a color conversion table, when RGB each have 8 bits, holding an assignment of an output value of CMYK or a device independent color space (a CIE XYZ color space, a CIE LAB/CIE LCh color space, or a similar color space) causes to much data volume with respect to input values of about 1678 million colors, which are 256 tones to the third power for each color. In view of this, it is general that the color conversion table, where the data volume is reduced by thinning the colors instead of using all colors in the RGB color space, is created and is stored in the image forming apparatus.

In the color conversion table where the data volume is reduced, the assignment from the color value in the RGB color space into the color value in the CMYK color space is being set for each grid point, which divides the RGB color space at a predetermined interval. For the color value other than the position of the grid point, the color value in the CMYK color space is calculated by an interpolation operation. In the interpolation operation, a method such as a linear interpolation or an interpolation by an approximation formula is used. For example, there is provided an image processing apparatus that preliminarily registers high-order bits as grid point information and low-order bits as information on determining an interpolation proportion and perform an N-point interpolation using information described above.

SUMMARY

An image forming apparatus according to one aspect of the disclosure includes an interpolation reference data creating unit, a reference space coordinate calculating unit, an interpolation operation unit, and a color conversion unit. The interpolation reference data creating unit, in a reference space where a first color space is divided into a plurality of hue planes, divides the hue plane with grid points, and creates interpolation reference data where triangular shapes formed by the grid points for an linear interpolation are varied in portions where saturation of the hue plane is equal to or less than a predetermined threshold and where the saturation of the hue plane is higher than the predetermined threshold. The reference space coordinate calculating unit refers to the interpolation reference data created by the interpolation reference data creating unit to calculate coordinates in the reference space of the color values in the first color space. The interpolation operation unit performs the linear interpolation with the coordinates of the triangular shapes formed by the grid points in the hue plane adjacent to the coordinates calculated by the reference space coordinate calculating unit so as to create a color conversion table indicative of a correspondence relationship between a color value in a first color space and a color value in a second color space. The color conversion unit converts a color value in the first color space into a color value in the second color space with the color conversion table.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 3A and 3B conceptually illustrate a color conversion table setting reading process according to the one embodiment;

FIG. 7 illustrates a flow chart of a detailed process of an interpolation operation process according to the one embodiment;

DETAILED DESCRIPTION

Figure 1:
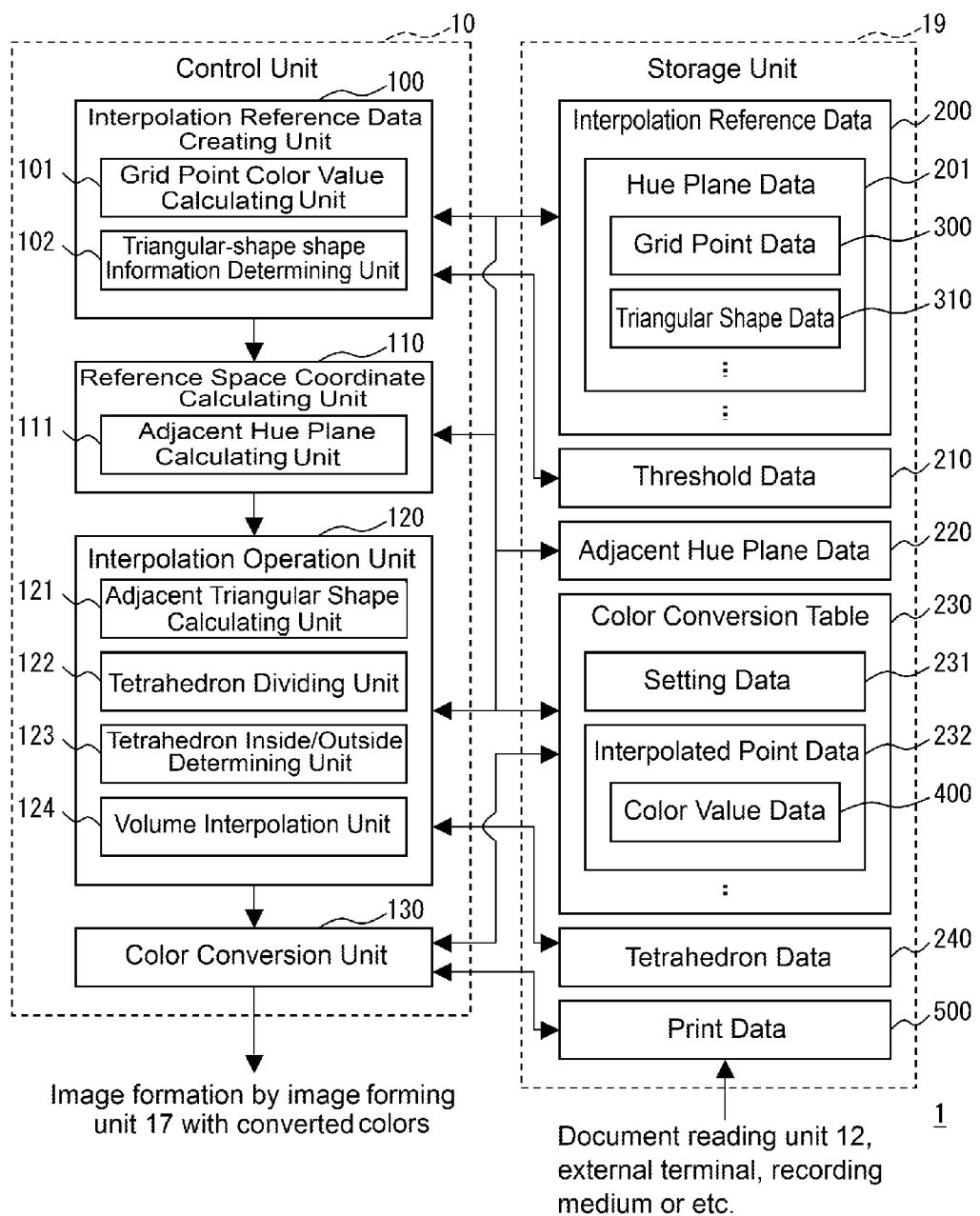
FIG. 1 illustrates a block configuration of a control unit and a storage unit of an image forming apparatus according to an embodiment of the disclosure.
Figure 2:
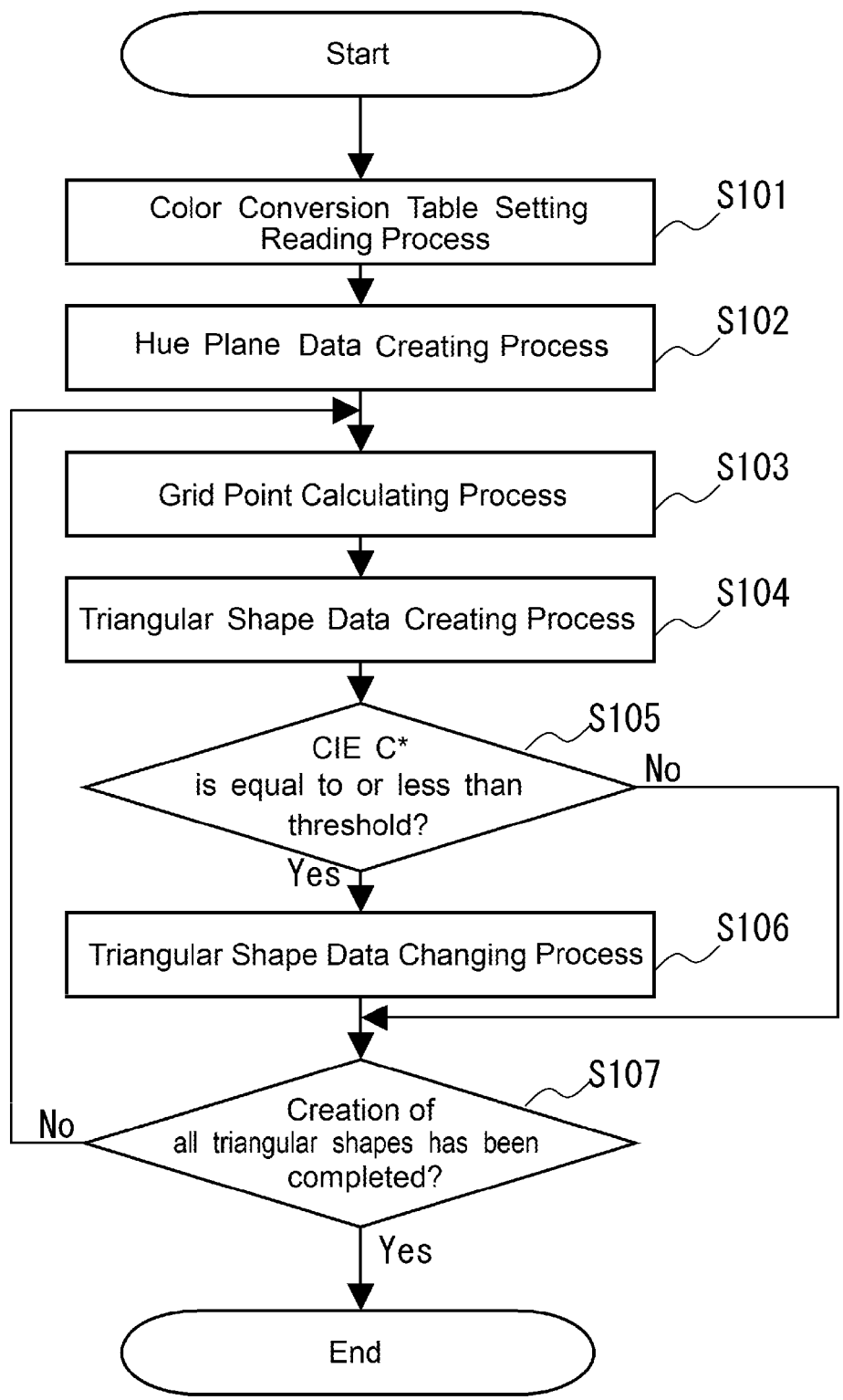
FIG. 2 illustrates a flow chart of an interpolation reference data creating process according to the one embodiment.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Configuration of Image Forming Apparatus

Figure 17:
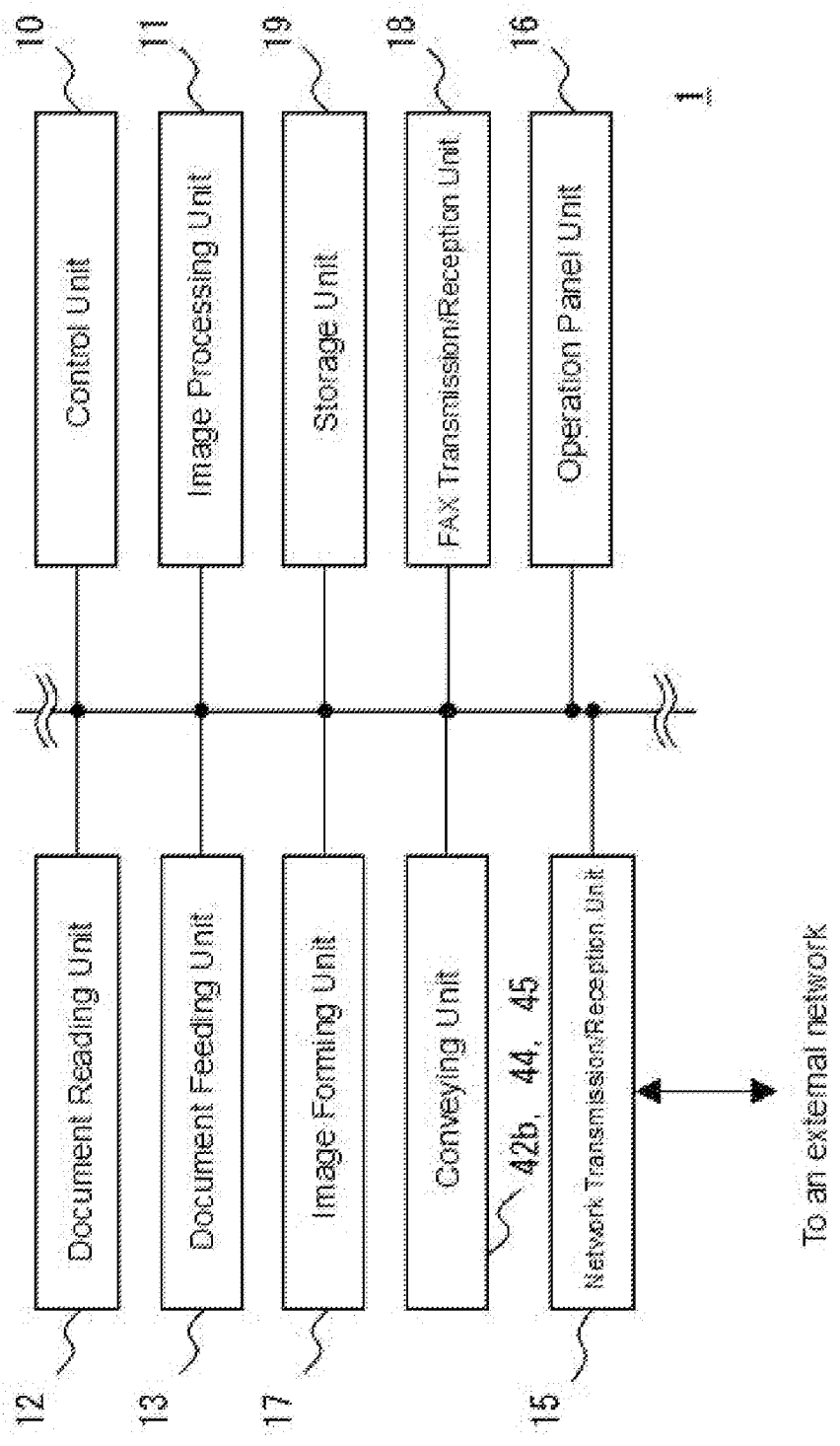
FIG. 17 illustrates a function block configuration of an image forming apparatus according to the one embodiment of the disclosure.

Firstly, a configuration of an image forming apparatus 1 will be described with reference to FIG. 17. The image forming apparatus 1 includes an image processing unit 11, a document reading unit 12, a document feeding unit 13, a conveying unit (a paper feed roller 42b, a conveyance roller pair 44, and a discharge roller pair 45), a network transmission/reception unit 15, an operation panel unit 16, an image forming unit 17, a FAX transmission/reception unit 18, and a storage unit 19 and a similar unit, which are connected to a control unit 10 via common bus or a similar communication network. The control unit 10 operates and controls the respective units.

The control unit 10 is an information processing unit such as a General Purpose Processor (GPP), a Central Processing Unit (CPU), a Micro Processing Unit (MPU), a Digital Signal Processor (DSP), a Graphics Processing Unit (GPU), and an Application Specific Processor (ASIC). The control unit 10 reads a control program stored in a ROM or a HDD of the storage unit 19, deploys this control program into a RAM, and executes this control program. This causes the control unit 10 to operate as each unit of function blocks described later. Further, the control unit 10 may perform the control of the entire apparatus corresponding to predetermined instruction information that is input from an external terminal (not illustrated) or the operation panel unit 16.

The image processing unit 11 is an operation control unit such as the Digital Signal Processor (DSP) and the Graphics Processing Unit (GPU). The image processing unit 11 is a unit that performs predetermined image processing on image data. For example, the image processing unit 11 performs various image processing such as scaling, print density adjustment, gradation adjustment, and image improvement. The image processing unit 11 stores the image read by the document reading unit 12 as print data 500 in the storage unit 19. At this time, the image processing unit 11 can also convert the print data 500 into a file unit in a PDF, a TIFF, or a similar format.

The document reading unit 12 is a unit that reads (scans) a set document. The document feeding unit 13 is a unit that conveys the document to be read by the document reading unit 12. The image forming unit 17 causes image formation on a recording sheet based on the data stored in the storage unit 19, the data read by the document reading unit 12, or the data acquired from the external terminal by an output instruction of users. The conveying unit conveys the recording sheet from a sheet feed cassette 42a (FIG. 18), and causes image formation on the recording sheet at the image forming unit 17, and then conveys the recording sheet to a stack tray 50. Here, the respective operations of the document reading unit 12, the document feeding unit 13, the conveying unit, and the image forming unit 17 will be described later.

The network transmission/reception unit 15 is a network connection unit that includes a LAN board, a wireless transceiver, and similar member for connecting to an external network such as LAN, wireless LAN, WAN, and a mobile phone network. The network transmission/reception unit 15 transmits and receives data via a data communication line and transmits and receives a voice signal via a voice-grade telephone line.

The operation panel unit 16 includes: a display unit such as an LCD; a numeric keypad; a start key; a cancel key; a button for switching action modes such as copy, FAX transmission, and scanner; a button for issuing an instruction for execution of a job related to printing, transmission, storage, recording or similar operation of a selected document; and an input unit such as a touch panel. The operation panel unit 16 acquires the instructions of various jobs of the image forming apparatus 1 from the user. Additionally, the information of each user can be input and/or changed in accordance with the user instruction acquired from the operation panel unit 16.

The FAX transmission/reception unit 18 is a unit for performing facsimile transmission/reception, and is connected to an ordinary telephone line, an ISDN line, or a similar line. Additionally, the FAX transmission/reception unit 18 can store a received facsimile image in the storage unit 19 as the print data 500 (FIG. 1). Further, the FAX transmission/reception unit 18 may perform facsimile transmission of drawing data 330 stored in the storage unit 19 instead of recording at the image forming unit 17.

The storage unit 19 is a storage unit that employs a recording medium such as a semiconductor memory such as a Read Only Memory (ROM) and a Random Access Memory (RAM) and a Hard Disk Drive (HDD). The RAM of the storage unit 19 holds the content of the memory by a function such as self-refreshing even during the power-saving state. The ROM and the HDD in the storage unit 19 store control programs for performing the operation control of the image forming apparatus 1. In addition, the storage unit 19 stores account settings of the user. Further, the storage unit 19 may include a region for a storage folder for every user.

Furthermore, in the image forming apparatus 1, the control unit 10 and the image processing unit 11 may be integrally formed like a GPU built-in CPU or a similar device, or a chip-on-module package. Additionally, the control unit 10 and the image processing unit 11 may each incorporate a RAM, a ROM, a flash memory, or a similar memory.

Operation of Image Forming Apparatus

Figure 18:
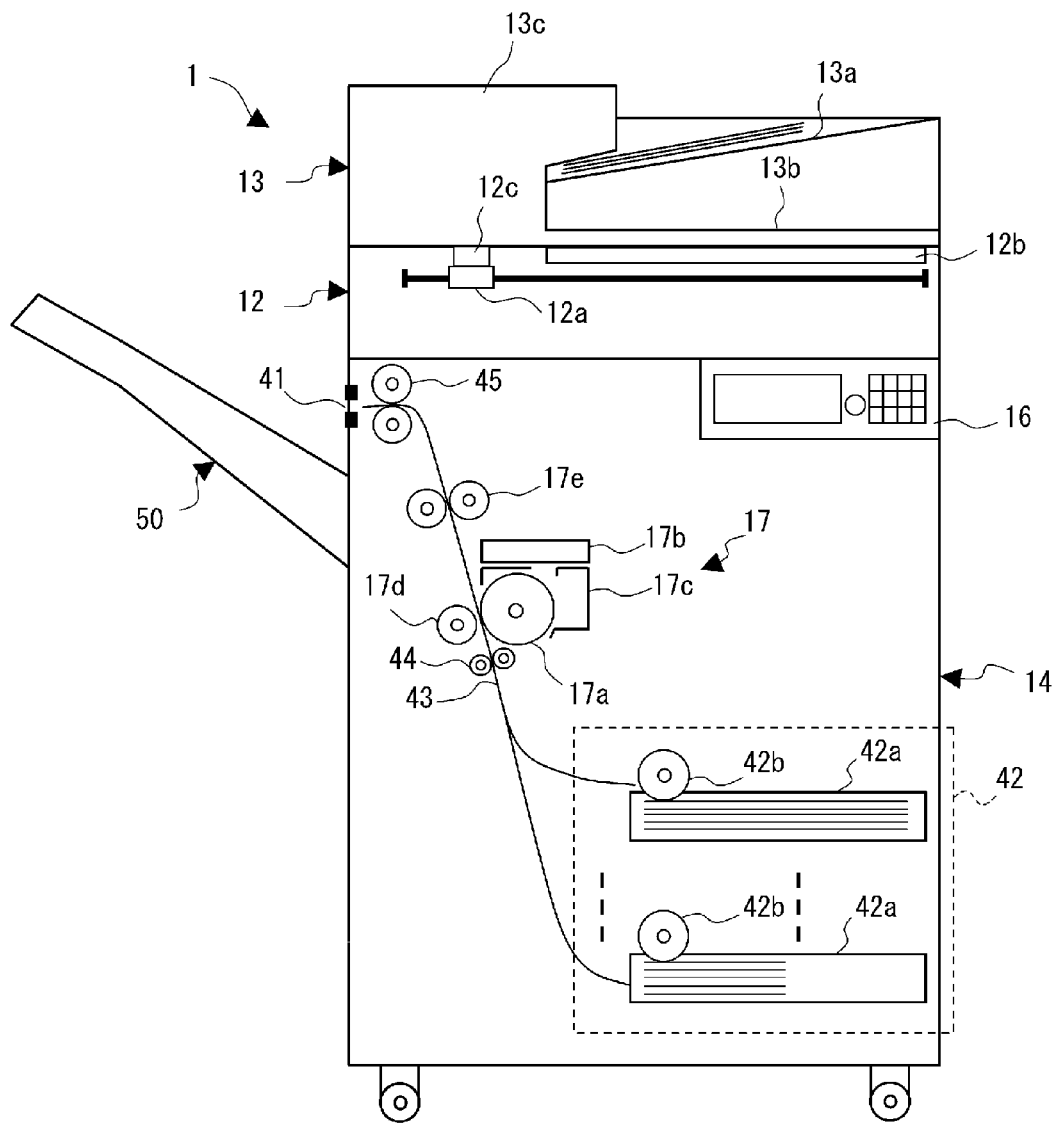
FIG. 18 schematically illustrates an external and internal configuration of the image forming apparatus according to the one embodiment.

Next, a description will be given of an external and internal configuration and an operation of the image forming apparatus 1 according to the one embodiment of the disclosure with reference to FIG. 18. The document reading unit 12 is arranged on the upper portion of a main unit 14. The document feeding unit 13 is arranged on the upper portion of the document reading unit 12. The stack tray 50 is arranged at the side of a discharge port 41, which is formed in the main unit 14, of recording sheets. The operation panel unit 16 is arranged on the front side of the image forming apparatus 1.

The document reading unit 12 includes a scanner 12a, a platen glass 12b, and a document reading slit 12c. The scanner 12a is constituted of an exposing lamp, a Charge Coupled Device (CCD), a Complementary Metal Oxide Semiconductor (CMOS) imaging sensor, and similar members. The scanner 12a is capable of moving in the conveyance direction of the document by the document feeding unit 13. The platen glass 12b is a platen constituted of a transparent member such as glass. The document reading slit 12c has a slit formed in a direction perpendicular to the conveyance direction of the document by the document feeding unit 13.

When reading the document placed on the platen glass 12b, the scanner 12a is moved to the position facing the platen glass 12b. Subsequently, the scanner 12a acquires the image data by reading the document while scanning the document placed on the platen glass 12b, and outputs the acquired image data to the control unit 10 (FIG. 17) included in the main unit 14. Further, when reading the document conveyed by the document feeding unit 13, the scanner 12a is moved to the position facing the document reading slit 12c. Subsequently, the scanner 12a acquires image data via the document reading slit 12c by reading the document in synchronization with the conveying operation of the document by the document feeding unit 13, and outputs the acquired image data to the control unit 10 included in the main unit 14.

The document feeding unit 13 includes a document platen 13a, a document discharging unit 13b, and a document conveying mechanism 13c. The document placed on the document platen 13a is sequentially fed one by one by the document conveying mechanism 13c, conveyed to the position facing the document reading slit 12c, and then discharged to the document discharging unit 13b. In addition, the document feeding unit 13 is constituted to be collapsible. Lifting up the document feeding unit 13 ensures opening the top surface of the platen glass 12b.

The main unit 14 includes the image forming unit 17, and also includes a paper sheet feeder 42, a paper sheet conveyance passage 43, the conveyance roller pair 44, and the discharge roller pair 45. The paper sheet feeder 42 includes a plurality of sheet feed cassettes 42a and a plurality of paper feed rollers 42b. The sheet feed cassettes 42a store respective recording sheets having different sizes or orientations. The paper feed roller 42b feeds the recording sheet one by one to the paper sheet conveyance passage 43 from the sheet feed cassette 42a. The paper feed roller 42b, the conveyance roller pair 44, and the discharge roller pair 45 function as a conveying unit. The recording sheet is conveyed by the conveying unit. The recording sheet, which is fed to the paper sheet conveyance passage 43 by the paper feed roller 42b, is conveyed toward the image forming unit 17 by the conveyance roller pair 44. Then, the recording sheet, having undergone recording in the image forming unit 17, is discharged to the stack tray 50 by the discharge roller pair 45.

The image forming unit 17 includes a photoreceptor drum 17a, an exposing unit 17b, a developing unit 17c, a transfer unit 17d, and a fixing unit 17e. The exposing unit 17b is an optical unit that includes a laser device, a mirror, a lens, and a LED array, and similar members. The exposing unit 17b outputs a light or similar radiation based on the image data to expose the photoreceptor drum 17a, and forms an electrostatic latent image on the surface of the photoreceptor drum 17a. The developing unit 17c is a developer unit that develops the electrostatic latent image formed on the photoreceptor drum 17a using toner. The developing unit 17c forms a toner image based on the electrostatic latent image on the photoreceptor drum 17a. The transfer unit 17d transfers the toner image formed on the photoreceptor drum 17a by the developing unit 17c to the recording sheet. The fixing unit 17e heats the recording sheet, to which the toner image is transferred by the transfer unit 17d, to fix the toner image to the recording sheet.

Configurations of Control Unit and Storage Unit of Image Forming Apparatus 1

A description will be given of configurations of the control unit 10 and the storage unit 19 of the image forming apparatus 1 with reference to FIG. 1. The image forming apparatus 1 includes an interpolation reference data creating unit 100, a reference space coordinate calculating unit 110, an interpolation operation unit 120, and a color conversion unit 130. The storage unit 19 stores interpolation reference data 200, threshold data 210, adjacent hue plane data 220, a color conversion table 230, tetrahedron data 240, and the print data 500.

The interpolation reference data creating unit 100 divides a hue plane with grid points in a reference space where a RGB color space is divided into a plurality of hue planes, and creates the interpolation reference data 200 where a shape of a triangular shape formed with the grid points for performing a linear interpolation is changed in portions where saturation of the hue plane is equal to or less than a predetermined threshold and where the saturation of the hue plane is higher than the predetermined threshold. At this time, the interpolation reference data creating unit 100 sets the grid points to grid point data 300 of hue plane data 201 in the interpolation reference data 200, and sets the shape of the triangular shape formed by the grid points to triangular shape data 310 to change the shape of the triangular shape.

The reference space coordinate calculating unit 110 refers to the interpolation reference data 200 created by an interpolation reference space setting unit, and calculates a coordinate in the base (the reference) space used by the interpolation reference data 200 with respect to a color value in the RGB color space corresponding to respective interpolated points.

The interpolation operation unit 120 performs the linear interpolation with the coordinates of the triangular shape formed by the grid points in the hue plane adjacent to the coordinates calculated by the reference space coordinate calculating unit 110 to create the color conversion table 230.

The color conversion unit 130 converts the color value in the RGB color space into the color value in the CMYK color space based on the created color conversion table 230.

The interpolation reference data creating unit 100 includes a grid point color value calculating unit 101 (a grid point color value calculating unit) and a triangular-shape shape information determining unit 102 (a triangular-shape shape information determining unit). The grid point color value calculating unit 101 calculates the color value in a CIE LAB color space (hereinafter, simply referred to as "CIE LAB color space" for the color space expressed by CIE LAB/CIE LCh) with respect to the color value at the grid point in the RGB color space. The triangular-shape shape information determining unit 102 determines and/or varies the shape of the triangular shape formed by the grid points, based on the color value in the CIE LAB color space with respect to the grid point data 300 of the hue plane data 201 calculated by the grid point color value calculating unit 101. The triangular-shape shape information determining unit 102 sets the shape of the triangular shape determined and/or varied to the triangular shape data 310.

The reference space coordinate calculating unit 110 includes an adjacent hue plane calculating unit 111. The adjacent hue plane calculating unit 111 calculates the hue plane adjacent to the color value in the RGB color space corresponding to each interpolated point. At this time, the adjacent hue plane calculating unit 111, with respect to each interpolated point included in interpolated point data 232 in the color conversion table 230, searches whether each interpolated point exists in which hue plane or between which two hue planes of the interpolation reference data 200 from the hue plane data 201. The adjacent hue plane calculating unit 111 sets the information on the searched hue plane to the adjacent hue plane data 220.

The interpolation operation unit 120 includes an adjacent triangular shape calculating unit 121, a tetrahedron dividing unit 122, a tetrahedron inside/outside determining unit 123, and a volume interpolation unit 124. The adjacent triangular shape calculating unit 121 refers to the adjacent hue plane data 220, and calculates the coordinates of the triangular shape formed by the grid points with respect to respective two hue planes, adjacent to the color value in the RGB color space, which corresponds to each of the interpolated points calculated by the adjacent hue plane calculating unit 111. The adjacent triangular shape calculating unit 121 sets the calculated coordinates of the triangular shape to the tetrahedron data 240. The tetrahedron dividing unit 122 refers to the tetrahedron data 240 and divides a triangular prism into tetrahedrons. The triangular prism is formed with the coordinates of the triangular shape formed by the grid points in the adjacent two hue planes, where the coordinates of the triangular shape are calculated by the adjacent triangular shape calculating unit 121. The tetrahedron dividing unit 122 sets the coordinates of the divided triangular prism or similar coordinates to the tetrahedron data 240. The tetrahedron inside/outside determining unit 123 refers to the tetrahedron data 240, and performs an inside/outside determination whether or not the interpolated point in the color conversion table 230 exists inside the tetrahedron to each of the tetrahedrons divided by the tetrahedron dividing unit 122. When it is determined that the interpolated point is inside the tetrahedron by the tetrahedron inside/outside determining unit 123, the volume interpolation unit 124 refers to the tetrahedron data 240, and calculates a volume ratio of a solid formed with the grid points of the tetrahedron and the interpolated point. The volume interpolation unit 124 calculates an interpolation value of the color value in the CIE LAB color space with respect to the interpolated point based on the calculated volume ratio.

The interpolation reference data 200 is the data of the reference space where the RGB color space is divided into a plurality of the hue planes and referred to create the color conversion table 230.

The threshold data 210 is the data that indicates the threshold of the CIE C* referred when the shape of the triangular shape, which is set in the triangular shape data 310, is varied, based on the color value in the CIE LAB color space calculated by the RGB color value of each grid point data 300 of the hue plane data 201. The threshold data 210 may be set, for example, based on a device dependent value such as a chromogenic property in the CMYK color space of the image forming apparatus 1.

The adjacent hue plane data 220 is the data that indicates the hue plane in the reference space adjacent to the interpolated point of the interpolated point data 232 searched from the color conversion table 230. In the adjacent hue plane data 220, for example, when the interpolated point of the interpolated point data 232 is in the hue plane in the reference space, the hue plane data 201 that indicates the hue plane is set. Further, when the interpolated point is not in the hue plane, the adjacent hue plane data 220 includes the value that indicates the adjacent two hue planes.

The color conversion table 230 includes a value for conversion into the CMYK color space, a set value of division, or similar values where each apex of a cube, which is obtained by dividing the RGB color space at a predetermined interval, is set to the interpolated point.

The tetrahedron data 240 is the data that indicates a construction of the tetrahedron obtained by dividing the triangular prism, which is configured by the triangular shapes in the two hue planes where the interpolated points held by the adjacent hue plane data 220 are adjacent. Further, the tetrahedron data 240, with respect to the two tetrahedrons connecting the interpolated point and the triangular shapes in the two hue planes respectively, includes the data that indicates the coordinates and volume ratios of the two tetrahedrons.

The print data 500 may be the image data read by the document reading unit 12, the image data received by the FAX transmission/reception unit 18, the data of a Page Description Language (PDL) acquired from an external terminal or a similar device via the network transmission/reception unit 15 or acquired from an external recording medium, the data of an electronic document format such as Portable Document Format (PDF), or the image data such as JPEG (jpg), GIF, or a bitmap. The print data 500 may include various setting data. Additionally, the print data 500 may include property information such as a file name, a file type, a creation time, an update time, and a browse time. The print data 500 may include the data of an object unit for drawing such as characters and images.

Furthermore, the interpolation reference data 200 includes the hue plane data 201. The hue plane data 201 is the data including the coordinates, the constructions, and the color values or similar data of the hue planes where the reference space is divided. The hue plane data 201, for example, includes the respective hue planes obtained by dividing the RGB color space into six or more pieces with an achromatic-axis in the RGB color space centered and respective apex directions of RMBCGY set as a hue. The hue plane in the hue plane data 201 may be the shape of the triangular shape, connecting respective points of K and W, which are the ends of the achromatic-axis, and a point of a peak value (hereinafter referred to as peak point), which is the maximum saturation value in the RGB color space. The hue plane data 201 may include the value of a coordinate system of the CIE LCh.

Additionally, the hue plane data 201 includes the grid point data 300 and the triangular shape data 310. The grid point data 300 is the date such as the coordinate and the color value of the grid point where the hue plane is divided into a plurality of pieces. In the grid point data 300, for example, the hue plane is divided with a division number corresponding to the division number of respective tones in the color conversion table 230. In addition, the data of the color value in the grid point data 300 may include the color value in the RGB color space, the color value in the CIE LAB color space, and the color value in the CMYK color space. Furthermore, the grid point data 300 may include a coordinate value where the color value in the CIE LAB color space is converted into the coordinate system of the CIE LCh. The triangular shape data 310 is the date of the construction of the grid point data 300 referred for the linear interpolation. The triangular shape data 310 may be indicated with a pointer or a similar indicator of the grid point data 300.

Further, the color conversion table 230 includes setting data 231 and the interpolated point data 232. The setting data 231 includes the tone number in the RGB color space of the color conversion table 230, the division number into the cube, a setting that sets respective apexes of the divided cube to be the interpolated point, a setting of the tone number in the CMYK color space, a default device dependent value of the image forming apparatus 1, the calibrated device dependent value, or similar values. In the interpolated point data 232, color value data 400 is set for assigning a color in the RGB color space at the equally spaced interpolated point to the color in the CMYK color space. The color value data 400 of the interpolated point data 232 may be a data format such as a structure including the tone data of respective colors of C, M, Y, and K. In addition, as an intermediate value, the color value data 400 may include the color value in the CIE LAB color space corresponding to the color value in the RGB color space and the color value in the CMYK color space to be corresponding to the color value in the CIE LAB color space by gamut mapping. Furthermore, when incorporating into a product as the color conversion table 230 after calculation, the color value data 400 alone for the assignment to the color in the CMYK color space may be included as the color conversion table 230.

Here, the control unit 10 of the image forming apparatus 1 functions as the interpolation reference data creating unit 100, the reference space coordinate calculating unit 110, the interpolation operation unit 120, and the color conversion unit 130. Additionally, the respective units of the aforementioned image forming apparatus 1 are hardware resources for executing each process of the color conversion table creating method and the color conversion table creating program of the disclosure.

Interpolation Reference Data Creating Process by Image Forming Apparatus

Next, a description will be given of an interpolation reference data creating process by the image forming apparatus 1 according to the embodiment of the disclosure with reference to FIG. 2, to FIGS. 4A to 4E. A color conversion drawing process of the embodiment, for example, creates the hue plane data 201, which includes the hue plane dividing the RGB color space into a plurality of pieces. In addition, the interpolation reference data creating unit 100 calculates the coordinate of the grid point as the grid point data 300 with respect to each hue plane of the created hue plane data 201. Further, the interpolation reference data creating unit 100 also creates the triangular shape data 310 to use for the linear interpolation from the calculated grid point data 300. At this time, with respect to the value in the CIE LAB color space where each RGB color value of the grid point data 300 is changed, when the value of a CIE C* is equal to or less than the predetermined threshold, the interpolation reference data creating unit 100 varies the shape of the triangular shape data 310. In the color conversion drawing process of the embodiment, the interpolation reference data creating unit 100 in the control unit 10 mainly executes the program stored in the storage unit 19 using the hardware resources, collaborating with the respective units. A description will be given of the interpolation reference data creating process in detail for the respective steps with reference to FIG. 2.

Step S101

First, the control unit 10 performs a color conversion table setting reading process. The control unit 10 reads the size and the division number or a similar value of the RGB color space to use them for the reference space of interpolation from the setting data 231 in the color conversion table 230.

A description will be given of a concept of the interpolated point in the color conversion table 230 with reference to FIGS. 3A and 3B. FIG. 3A illustrates an example where the RGB color space of the color space of an additive color system is expressed as the cube in three-dimensional space. That is, the cube in FIG. 3A indicates the position of each color when each color is added to the respective axial directions of an R (Red)-axis, a G (Green)-axis, and a B (Blue)-axis from K (Black) of the apex. For example, when the tone of each RGB color is expressed by 8 bits (0 to 255), as the apexes of the cube, K of Black can be expressed as RGB=(0, 0, 0), similarly, R, G, and B can be expressed as follows; RGB=(255, 0, 0) for R, RGB=(0, 255, 0) for G, and RGB=(0, 0, 255) for B. Further, Y, C, M, the apexes of the color where two kinds of color among RGB are added, are expressed as follows; RGB=(255, 255, 0) for Y(Yellow), RGB=(0, 255, 255) for C(Cyan), and RGB=(255, 0, 255) for M(Magenta). Furthermore, W, the apex where all three kinds of colors of RGB are added, is expressed as RGB=(255,255,255). FIG. 3B conceptually illustrates creation of the color conversion table 230 with respective elements in the RGB color space equally spaced and set as the interpolated point. As the aforementioned example, when the tone is 8 bits in RGB, it is not realistic to store all the assignment of the colors in the CMYK color space: the assignment amounts to about 17 million colors, which is 256 (8 bits) to the third power. In view of this, with the tone divided, the assignment of the CMYK color is stored for each interpolated point, which is perpendicular to each other in the RGB color space. The example of FIG. 3B illustrates an example of creation of the interpolated point data 232 in the color conversion table 230, where the 8 bits-tone is divided into four and the number of the grid points of each axis is set to five, the assignment of the CMYK color is set for the respective interpolated points. In the color conversion table 230, for the respective colors of RGB other than the interpolated points, final color values in the CMYK color space are calculated by a color conversion process described later, using the color value in the CMYK color space with respect to the nearby interpolated point.

Step S102

Next, the control unit 10 performs a hue plane data creating process. The control unit 10 creates the hue plane data 201 by dividing the hue in the reference space into a predetermined number. A description will be given of the creation of the hue plane data 201 with a conceptual diagram of FIGS. 4A to 4E.

First, the control unit 10 calculates a relationship between the color value in the RGB color space and the color value in the CIE LAB color space at each interpolated point. That is, the color value in the RGB color space of the color value data 400 of the interpolated point data 232 registered as the color conversion table 230 is associated with the color value in the CIE LAB. In view of this, the reference space of the interpolation is calculated. According to FIG. 4A, the print data 500 as input, includes the color value in the RGB color space. However, as described above, the image forming apparatus 1 outputs the color value in the CMYK color space. In this embodiment, the RGB color space of input is converted into the CIE LAB color space which is the device independent space. Then, the relationship between the color value in the CMYK color space of the image forming apparatus 1, which is the output side, and the color value in the CIE LAB color space, which is the device independent space, is calculated. Then, by undergoing the gamut mapping from the color value in CIE LAB obtained as input to the color value in CIE LAB as output, the color conversion table 230, converting the color value in the RGB color space as input into the color value in the CMYK color space as output, can be calculated. Additionally, also in input, RGB color space such as sRGB or Adobe RGB, corresponding to a profile of input, may be used. That is, the RGB color space may once be converted into the color value in the CIE LAB color space corresponding to the profile of input, and then, the color value in the CIE LAB color space may be converted into the color value in the CMYK color space.

Figure 4A:
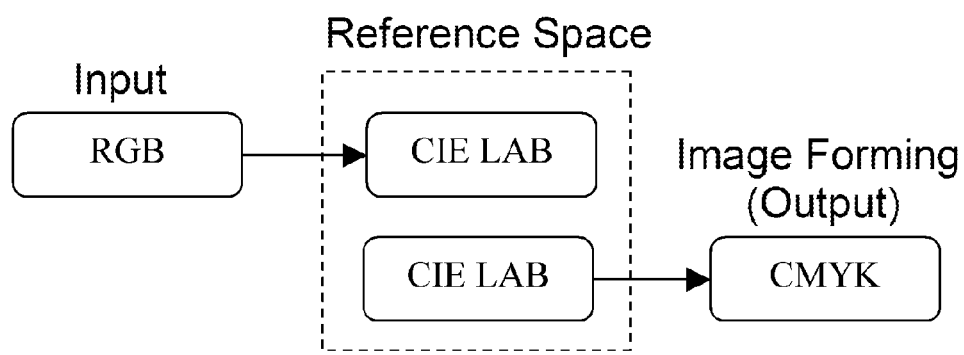
FIGS. 4A to 4E conceptually illustrate a hue plane data creating process according to the one embodiment.
Figure 4B:
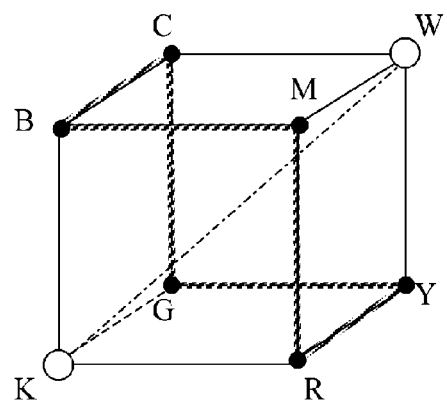
Figure 4C:
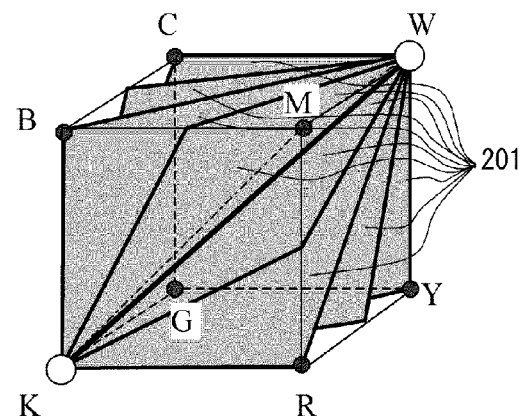
Figure 4D:
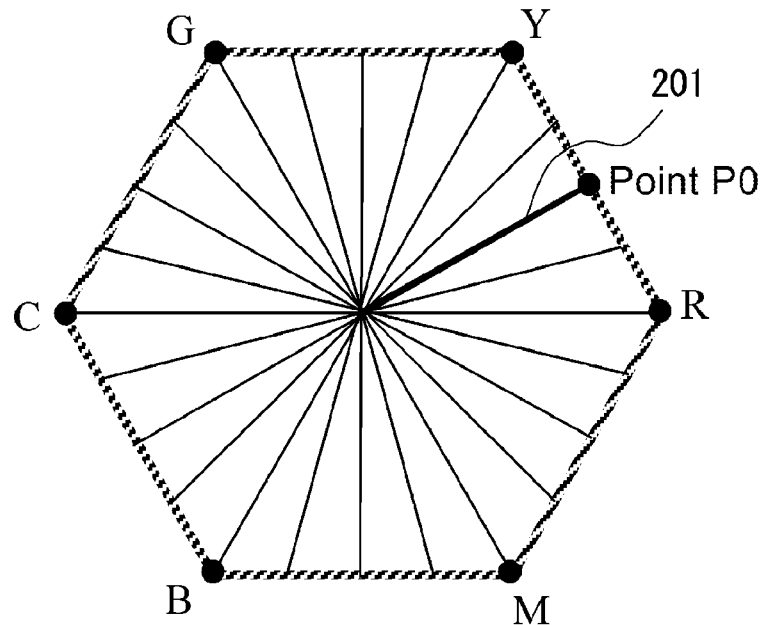
Figure 4E:
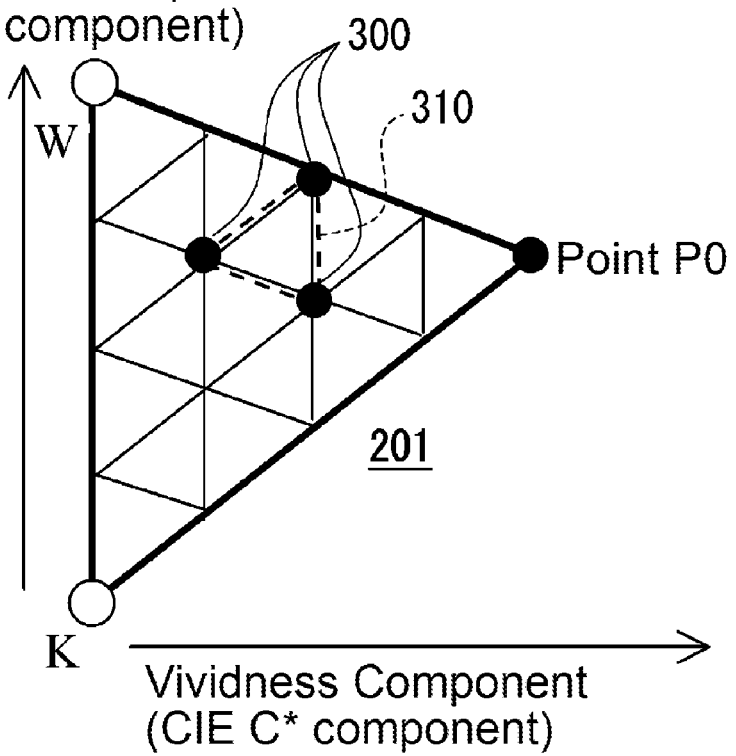

A description will be given of the conversion from an orthogonal coordinates in the RGB color space used for the color conversion table 230 into the coordinate system in the reference space which uses the hue plane with reference to FIGS. 4B and 4C. FIG. 4B illustrates the example which calculates the relationship with the CIE LAB color space, setting the colors at the respective apexes as basic colors in the orthogonal coordinates in the RGB color space which is the cubic space similar to FIG. 3A. A line which connects K (Black) and W (White) in the RGB color space is an achromatic gray-axis. That is, the achromatic colors are positioned on the axis from K to W. The colors are expressed as: RGB=(0, 0, 0), RGB=(1, 1, 1), RGB=(2, 2, 2) to RGB=(255, 255, 255). In contrast to this, the position and saturation in the CIE LAB color space are expressed by the hue which connects the gray-axis, where a line segment connecting K and W is set as a main-axis, and RMBCGY (Red, Magenta, Blue, Cyan, Green, and Yellow). In addition, the points on the line segment which connects RMBCGY in the RGB color space are maximum points in saturation (the vividness). FIG. 4C illustrates that, dividing the RGB color space at a predetermined angle around the gray-axis which connects K and W, a plane connecting the points on the line segment where saturation (the vividness) is maximum is calculated as the hue plane. The calculated coordinates or similar values in the hue plane are set to the hue plane data 201. FIG. 4D illustrates the front view of the RGB color space with the gray-axis upright, viewed from the upper portion. Here, with respect to one of the calculated hue plane data 201, the point of the maximum saturation (the vividness) is indicated as P0. FIG. 4E illustrates the example that, extracting one of the hue plane of the hue plane data 201 illustrated in FIG. 4D, expresses the hue plane with the coordinate system in the CIE LAB color space. The triangular shape connecting the gray-axis which connects K and W and the point P0 where saturation (the vividness) is maximum value becomes the hue plane.

Step S103

Here, the control unit 10 performs a grid point calculating process. The control unit 10 calculates the grid points which are basic of the triangular shape for performing the linear interpolation to the interpolation points, dividing the hue plane of the calculated hue plane data 201. That is, the control unit 10 calculates the coordinates of the grid points separated at the predetermined intervals for the respective hue planes and set them to the grid point data 300. The control unit 10 may also calculate the coordinates corresponding to a CIE L* component and a CIE C* component for each hue plane other than the coordinates in the RGB color space for each grid point by the grid point color value calculating unit 101. The coordinate corresponding to the CIE L* component and the CIE C* component corresponds to the color value in the CIE LAB color space. That is, the control unit 10 may convert a coordinate space of the orthogonal system into the coordinate system for each hue plane in the reference space. This can simplify the search at the time of the linear interpolation. FIG. 4E illustrates the example where the control unit 10 calculated the grid points in the hue plane of the hue plane data 201. The apexes of each triangular shape and W, K, the point P0 are the grid point.

Step S104

Figure 11:
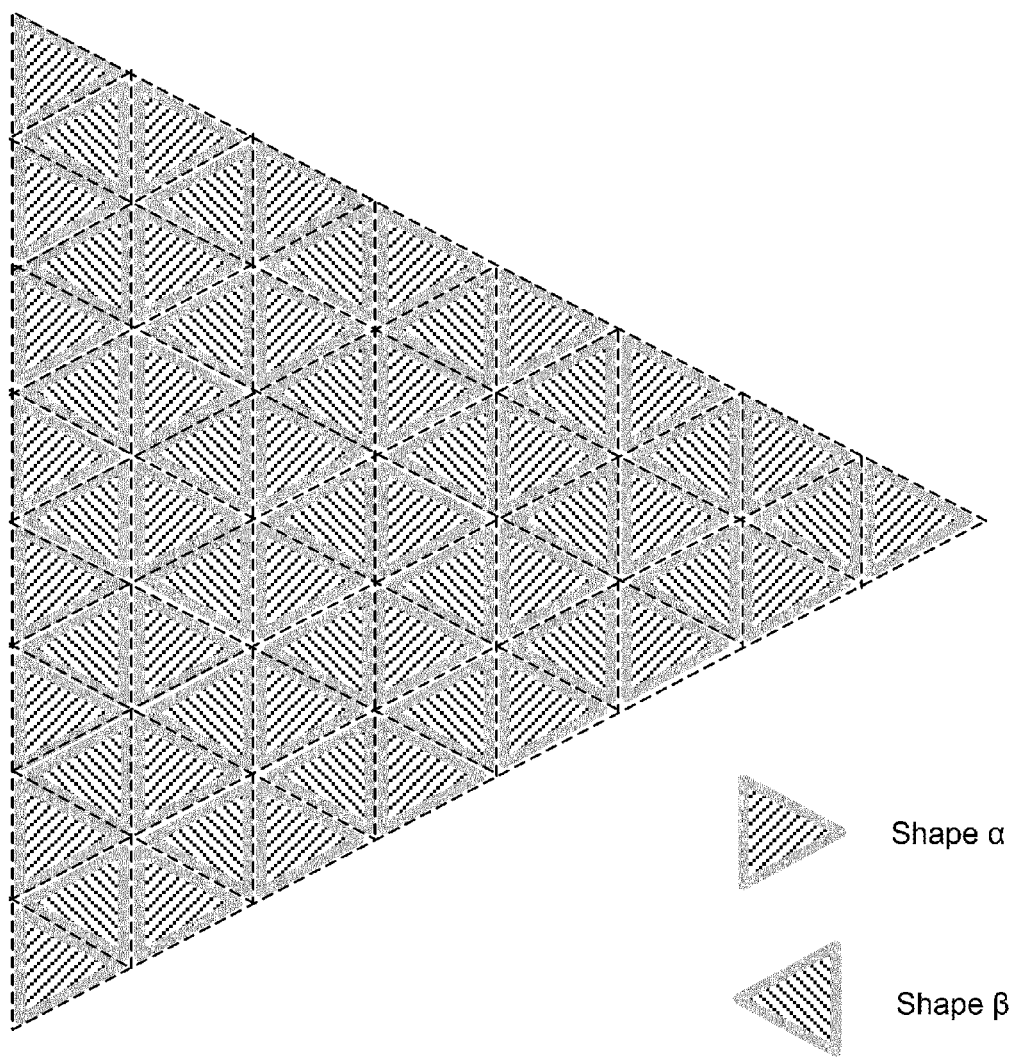
FIG. 11 conceptually illustrates a shape of a triangular shape in a hue plane according to a comparative example 1 of the disclosure.

Next, the control unit 10 performs a triangular shape data creating process. The control unit 10 calculates the triangular shape (the plane of the triangular shape) configured with three grid points to perform the interpolation operation for each hue plane by the triangular-shape shape information determining unit 102 and sets as the triangular shape data 310. In this embodiment, as the interpolation operation is performed with the triangular shape which connects the grid points in the hue plane of the hue plane data 201, a combination of specific triangular shapes are determined. In FIG. 4E, the adjacent three grid points indicated with black circles of the grid point data 300 are set as the triangular shape data 310. The control unit 10 creates the triangular shape data 310 by simply connecting the grid points to form the shape of the triangular shape in this step. The triangular shape data 310 may be the shape such as a set of the triangular shape, configured with the line segments parallel to the line segment connecting from W to P0 and passing through each grid point and the line segments parallel to the axis from K to W and passing through each grid point. That is, the shape of the triangular shape may be, for example as illustrated in FIG. 11, the combination of the triangular shape of a shape α and the triangular shape of a shape β which inverts the shape α right-and-left. In FIG. 11, pairing the triangular shape of the shape α and the triangular shape of the shape β, tile-shaped triangular shape data is formed.

Step S105

Next, the control unit 10 determines whether or not the CIE C* component is equal to or less than the threshold for the grid point data 300 of each hue plane data 201. The control unit 10 determines "Yes" for the grid point where the CIE C* component of the grid point data 300 is equal to or less than the threshold, assuming that the grid point exists in a low saturation portion. Further, the control unit 10 determines "No" for the grid point where the CIE C* component is larger than the threshold, assuming that the grid point exists in a high saturation portion. For the grid point of "Yes," the control unit 10 causes the process to proceed and executes Step S106. For the grid point of "No" the control unit 10 causes the process to proceed and executes Step S107.

Step S106

When the CIE C* component of the grid point of the grid point data 300 was equal to or less than the threshold, the control unit 10 performs a triangular shape data varying process. The control unit 10 varies the shape of the triangular shape of the triangular shape data 310 according to the triangular-shape shape information determining unit 102. For example, the control unit 10 changes to replace the grid point if there is the grid point at the position where one of the apexes of the triangular shape is incremented or decremented by one to the direction of the CIE C* component and CIE L* component. At this time, the control unit 10, for the triangular shape to be paired, if there is a grid point in the direction of the position which is decremented or incremented by one in the direction of the CIE C* component and the CIE L* component, replaces the apex corresponding to the changed apex. That is, the shape of the replaced triangular shape is, for example, the shape γ or the shape δ illustrated in FIG. 13 and FIG. 15. Furthermore, the process such as preparing different-shaped triangular shapes from the beginning for the low saturation portion and the high saturation portion at each coordinate position of all the grid points may be performed.

Step S107

Figure 5:
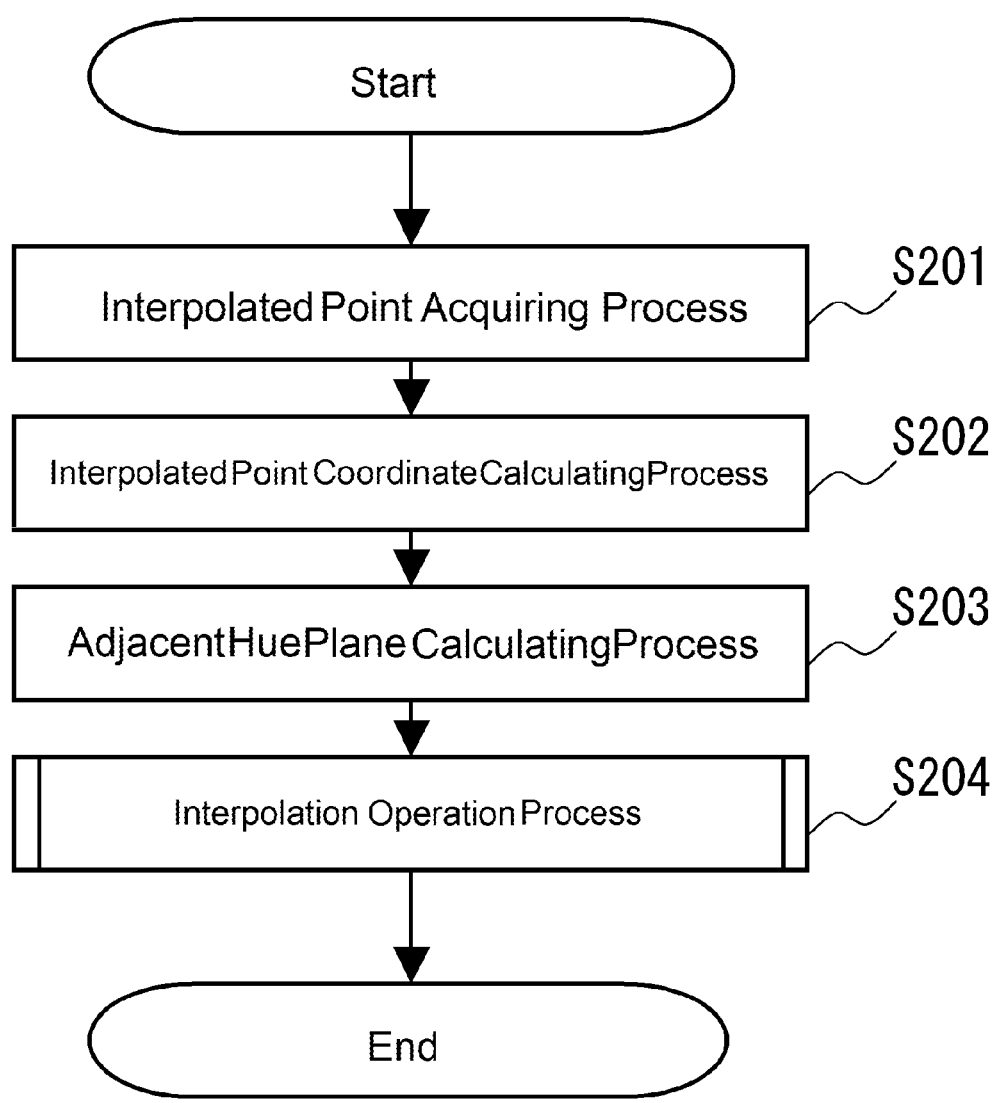
FIG. 5 illustrates a flow chart of an interpolated point interpolating process according to the one embodiment.

Here, the control unit 10 determines whether or not the creation of the triangular shape data 310 for all the hue plane data 201 is completed. When the triangular shape data 310 for all the hue plane data 201 is created and the change of the shape is completed, the control unit 10 determines "Yes." In addition, when the result is otherwise, the control unit 10 determines "No." When determining "Yes," the control unit 10 terminates the interpolation reference data creating process as the creation of the interpolation reference data 200 is completed. When determining "No," the control unit 10 returns the process to Step S103, and continues the creation of the triangular shape data 310 from each grid point data 300 of the remaining each hue plane data 201. Now, the interpolation reference data creating process according to the embodiment of the disclosure terminates. Interpolated Point Interpolating Process by Image Forming Apparatus Next, with reference to FIG. 5 to FIGS. 9A and 9B, a description will be given of the process by the image forming apparatus 1 according to the embodiment of the disclosure. The interpolated point interpolating process of the embodiment converts the coordinate system of the RGB color space into that of the CIE LAB color space at the interpolated point to facilitate search in the reference space. Then, from the calculated coordinate of the interpolated point, it is searched which of the hue planes of the hue plane data 201 of the interpolation reference data 200 surrounds the interpolated point. Then, the interpolation operation is performed with the grid point in the searched hue plane. In the color conversion drawing process of the embodiment, the control unit 10 mainly executes the program stored in the storage unit 19 using the hardware resources, collaborating with the respective units. The following describes an overview of the interpolated point interpolating process in respective steps with reference to FIG. 5.

Step S201

First, the control unit 10 performs an interpolated point acquiring process by the reference space coordinate calculating unit 110. The control unit 10 reads out the interpolated point data 232 from the color conversion table 230 to perform the interpolation operation by the linear interpolation.

Step S202

Next, the control unit 10 performs an interpolated point coordinate calculating process by the reference space coordinate calculating unit 110. The control unit 10 calculates the coordinate in the reference space of the interpolation reference data 200 from the coordinate of the interpolated point of the interpolated point data 232 in the RGB color space. This ensures simple search of the hue plane and the triangular shape in the reference space.

Step S203

Next, the control unit 10 performs an adjacent hue plane calculating process by the adjacent hue plane calculating unit 111 of the reference space coordinate calculating unit 110. The control unit 10 calculates the adjacent hue plane using the coordinate of the interpolation point in the reference space. That is, the control unit 10 searches in which hue plane or between which two hue planes the interpolated point exists, from the hue plane data 201 of the interpolation reference data 200, using the coordinate of the interpolated point of the interpolated point data 232. The control unit 10 set the searched hue plane of the hue plane data to the adjacent hue plane data 220. Use of the above-described coordinate ensures easily determining in which hue plane the interpolated point exists or with which hue planes the interpolated point is surrounded.

Figure 6A:
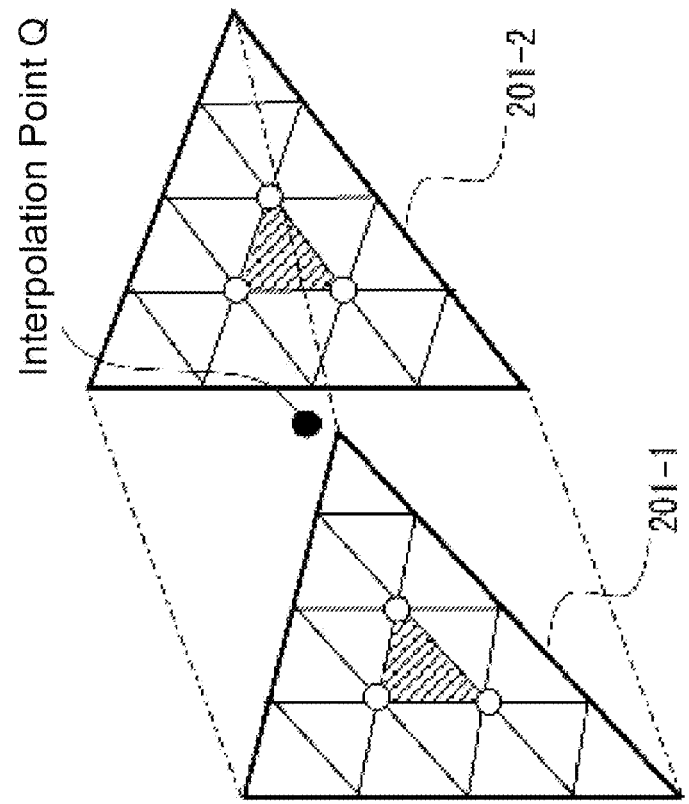
FIGS. 6A and 6B conceptually illustrate an adjacent hue plane calculating process according to the one embodiment.
Figure 6B:
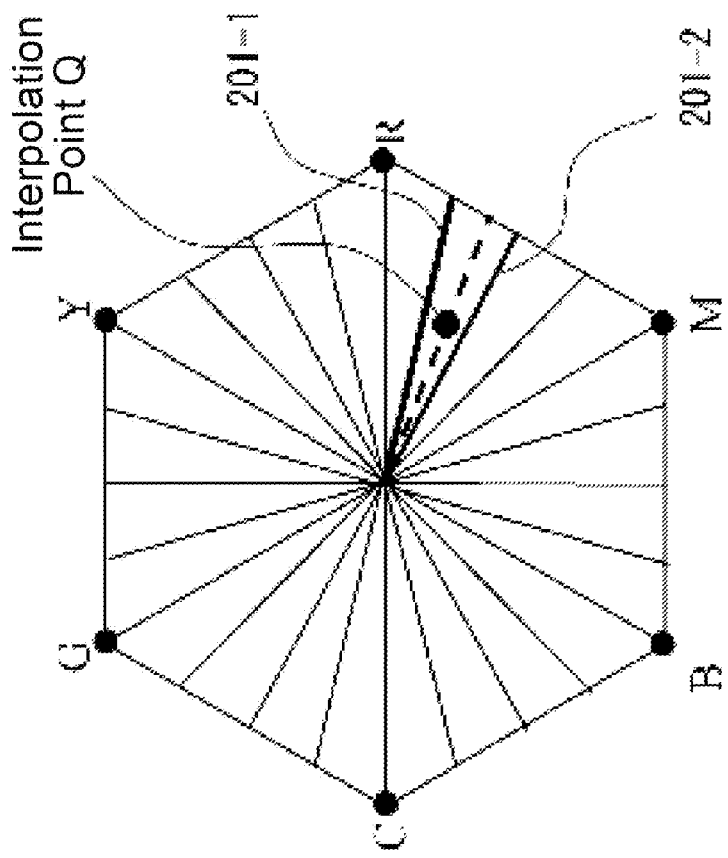

A description will be given of the relationship between an interpolation point Q in the RGB color space and the adjacent hue plane when performing an interpolation calculation using the grid point according to FIGS. 6A and 6B. FIG. 6A illustrates the example that the interpolation point Q is sandwiched between two hue planes of hue plane data 201-1 and hue plane data 201-2. The interpolation point which divides the RGB color space with the cube may not exists in the same plane as the hue plane, and thus two hue planes are searched. FIG. 6B illustrates that this interpolation point Q exists in the space sandwiched between two triangular shapes: the triangular shape surrounded by three grid points on the hue plane of the hue plane data 201-1 and the triangular shape surrounded by three grid points on the hue plane of the hue plane data 201-2.

Step S204

Next, the control unit 10 performs an interpolation operation process by the interpolation operation unit 120. The control unit 10, reading the adjacent hue plane data 220 where the searched hue plane is set, performs the interpolation for the interpolated point using the grid point of the hue plane. When the interpolated point exists in the hue plane of the hue plane data 201, the control unit 10 performs the interpolation with the triangular shape formed by the grid points in the hue plane. Further, when the interpolated point is sandwiched between two hue planes of the hue plane data 201, the control unit 10 performs the interpolation operation, creating a solid with the grid points of the hue plane. The detail of the process will be described later. Then, the interpolated point interpolating process according to the embodiment of the disclosure terminates.

Here, the interpolation operation process of an interpolated point interpolation will be described in detail with reference to FIG. 7 and the conceptual diagrams of FIGS. 8A and 8B, and FIGS. 9A and 9B.

Step S301

Next, the control unit 10 determines whether or not the interpolated point is determined to be on the hue plane by the adjacent triangular shape calculating unit 121 of the interpolation operation unit 120. When the interpolated point exists in the hue plane, the control unit 10 determines "Yes." Further, when the result is otherwise, that is, the interpolated point is surrounded by two hue planes, the control unit 10 determines "No." When determining "Yes," the control unit 10 causes the process to proceed to Step S302. When determining "No," the control unit 10 causes the process to proceed to Step S303.

Step S302

When the interpolated point exists in the hue plane, the control unit 10 performs a triangular shape interpolation value calculating process by the adjacent triangular shape calculating unit 121 of the interpolation operation unit 120. The control unit 10 calculates the triangular shape in which the interpolated point exists, and calculates the color value in the CIE LAB space, performing the linear interpolation based on distances in the reference space from the respective apexes of the triangular shape to the interpolated point. Additionally, with reference to the setting data 231 of the color conversion table 230, the control unit 10 calculates the color value of the device dependent CMYK color space corresponding to the calculated color value of the CIE LAB color space, setting it to the corresponding color value data 400 of the interpolated point data 232. Then, the control unit 10 terminates the interpolation operation process.

Step S303

When the interpolated point is surrounded by adjacent two hue planes, the control unit 10 performs a triangular shape calculating process by the adjacent triangular shape calculating unit 121 of the interpolation operation unit 120. The control unit 10 draws perpendicular lines to the two hue planes respectively, and calculates the triangular shape in which intersections of the hue plane exists. Furthermore, the control unit 10, forming a triangular prism enclosed by the respective triangular shapes in the two hue planes, set it to the tetrahedron data 240.

Step S304

Figure 8A:
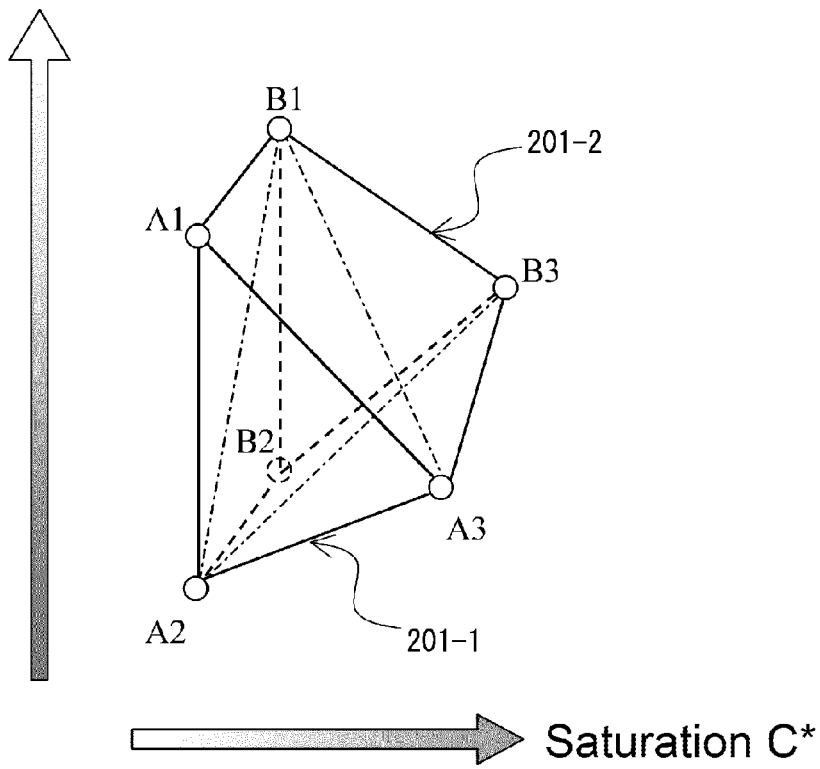
FIGS. 8A and 8B conceptually illustrate a tetrahedron division process according to the one embodiment.
Figure 8B:
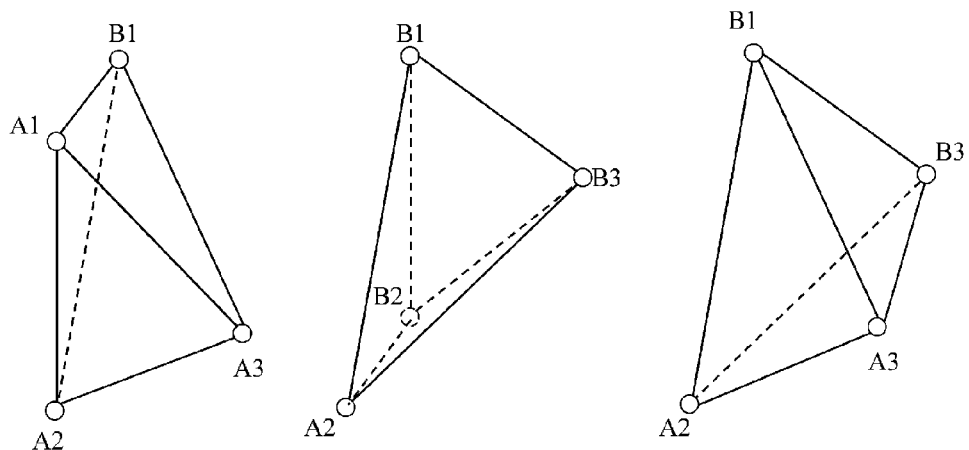
Figure 9A:
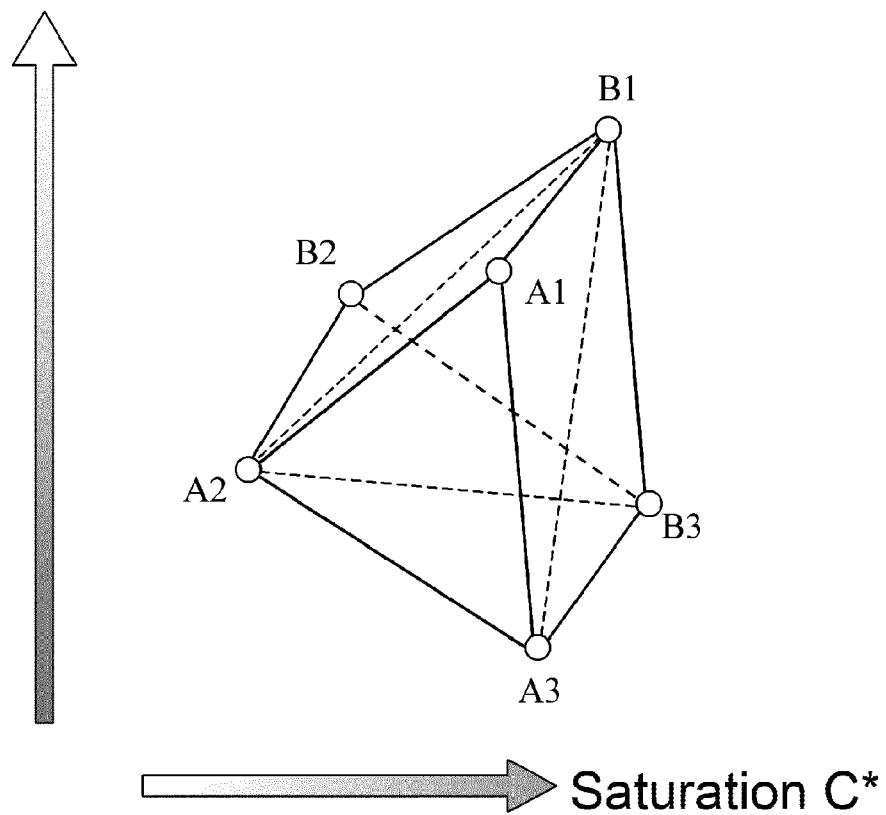
FIGS. 9A and 9B conceptually illustrate a tetrahedron division process according to the one embodiment.
Figure 9B:
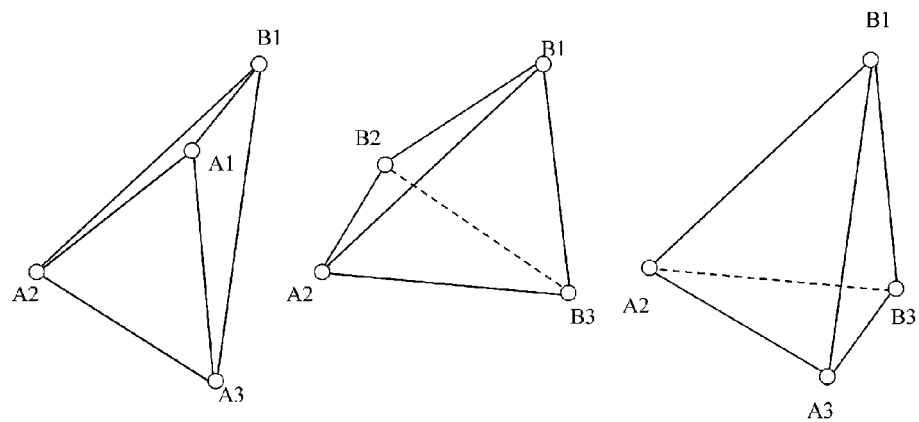

Next, the control unit 10 performs a tetrahedron division process by the tetrahedron dividing unit 122 of the interpolation operation unit 120. The control unit 10 divides the triangular prism enclosed by the respective triangular shapes of the two hue planes into three tetrahedrons. Describing with reference to FIGS. 8A and 8B, FIGS. 9A and 9B, the triangular prism obtained from the two triangular shapes is usually divided into three. FIG. 8A illustrates the example of the triangular prism enclosed by the two triangular shapes. This triangular prism is formed by the triangular shape connecting grid points A1, A2, A3 of the hue plane data 201-1 and the triangular shape connecting grid points B1, B2, B3 of the hue plane data 201-2. FIG. 8B illustrates the shape when the triangular prism in FIG. 8A is divided into three tetrahedrons. In FIG. 8B, the three tetrahedrons are formed by selecting four points from the triangular prism. However, when the two triangular shapes are in contact with the gray-axis, A1 and B1, and A2 and B2 indicate the same positions and an area is zero except the tetrahedron connecting the grid points B1-A2-A3-B3, and thus this case cannot be used for the interpolation operation. In view of this, the interpolation operation is performed using other tetrahedrons. FIG. 9A illustrates other example of the triangular prism enclosed by the two triangular shapes. This triangular prism is formed by the triangular shape formed by the grid points A1, A2, A3 of the hue plane data 201-1 and the triangular shape formed by the grid points B1, B2, B3 of the hue plane data 201-2. FIG. 9B illustrates the shape when the triangular prism in FIG. 9A is divided into three tetrahedrons. In FIG. 9B, also, the three tetrahedrons are formed by selecting four points from the triangular prism. When being in contact with the gray-axis, A2 and B2 indicates the same position and the volume of the tetrahedron connecting the grid points B1-A2-A3-A1 is zero, and thus this case cannot be used for the interpolation operation. Then, also, the interpolation operation is performed using other tetrahedrons.

Step S305

Here, the control unit 10 performs an inside/outside determination process by the tetrahedron inside/outside determining unit 123 of the interpolation operation unit 120. The control unit 10 performs an inside/outside determination calculating whether or not the interpolated point exists inside the tetrahedron by comparing the coordinates for the formed three tetrahedrons respectively.

Step S306

Next, the control unit 10 determines whether or not the interpolated point existed inside the tetrahedron by the tetrahedron inside/outside determining unit 123 of the interpolation operation unit 120. When, as a result of the aforementioned inside/outside determination, the interpolated point existed inside any of the three tetrahedrons, the control unit 10 determines "Yes." In addition, otherwise, that is, when the interpolated point did not exist inside the tetrahedron, the control unit 10 determines "No." When determining "Yes," the control unit 10 causes the process to proceed to Step S307. When determining "No," the control unit 10 causes the process to proceed to Step S308.

Step S307

When the interpolated point existed inside the tetrahedron, the control unit 10 performs a volume ratio interpolation value calculating process by the volume interpolation unit 124 of the interpolation operation unit 120. When the interpolated point was determined to be the inside based on the aforementioned inside/outside determination, the control unit 10 calculates the color value in the CIE LAB color space of the interpolated point from the grid point using the volume ratio. At this time, the control unit 10 calculates the color value in the CIE LAB color space, calculating the ratio of the volume of the solid formed by the grid point of each apex of the tetrahedron and the interpolated point and then performing the linear interpolation with the ratio. The control unit 10, referring the setting data 231 of the color conversion table 230 and calculating the color value in the device dependent CMYK color space corresponding to the color value in the CIE LAB color space, sets the color value to the color value data 400 of the corresponding interpolated point data 232. Then, the control unit 10 terminates the interpolation operation process.

Step S308

When the interpolated point was not inside the tetrahedron, the control unit 10 determines whether or not the interpolated point was not inside all of the three tetrahedrons by the tetrahedron inside/outside determining unit 123 of the interpolation operation unit 120. When there is not the interpolated point inside of any of the three tetrahedrons, the control unit 10 determines "Yes." Additionally, otherwise, that is, when the interpolated point was determined to be outside of all of the three tetrahedrons, the control unit 10 determines "No." When determining "Yes," the control unit 10 causes the process to proceed to Step S309. When determining "No," the control unit 10 returns the process to Step S305 and continues determining whether or not the interpolated point is inside any of the other three tetrahedrons.

Step S309

When there were not the interpolated point the entire inside of the three tetrahedrons, the control unit 10 performs another triangular prism selection process by the adjacent triangular shape calculating unit 121 of the interpolation operation unit 120. The control unit 10, in the adjacent two hue planes, selects the candidate of the triangular prism from other grid point surrounding the interpolated point. Then, the control unit 10, returning the process to Step S301, causes the process to proceed. Now, the interpolation operation process according to the embodiment of the disclosure terminates.

Color Conversion Drawing Process by Image Forming Apparatus

Figure 10:
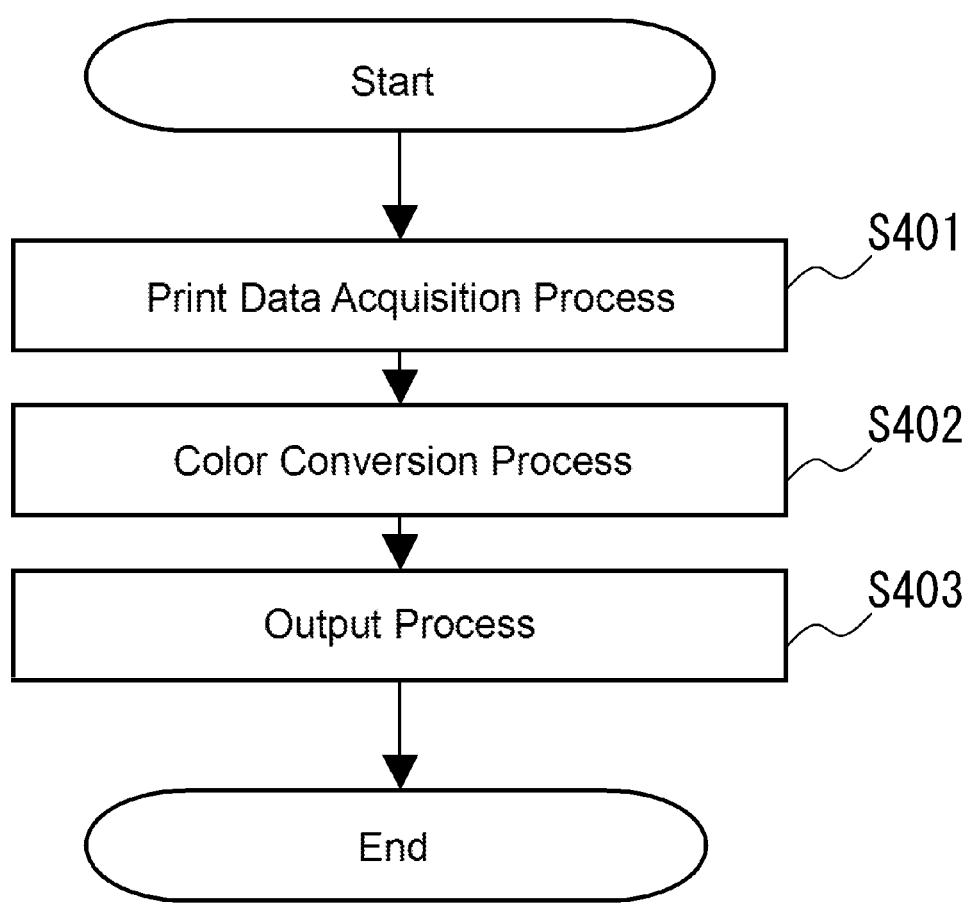
FIG. 10 illustrates a flow chart of a color conversion drawing process according to the one embodiment.

Next, with reference to FIG. 10, the following describes the color conversion drawing process by the image forming apparatus 1 according to the embodiment of the disclosure. The color conversion drawing process of the embodiment performs a color conversion to the print data 500 using the created color conversion table 230 and output. In the color conversion drawing process of the embodiment, the color conversion unit 130 of the control unit 10 mainly executes the program stored in the storage unit 19 using the hardware resources, collaborating with the respective units. With reference to the flow chart of FIG. 10, the following describes the color conversion drawing process in detail in the respective steps.

Step S401

First, the control unit 10 performs a print data acquisition process. The control unit 10 reads and acquires the document placed on the document reading unit 12 as the print data 500. In this case, an object included in the print data 500 is mainly the image data of respective pages. Further, the control unit 10 may obtain the print data 500 received via facsimile from the FAX transmission/reception unit 18. In this case, also, the object included in the print data 500 is mainly the image data of the respective pages. Furthermore, the control unit 10 may acquire the print data 500 transmitted from other terminals or the server (not illustrated) from the network transmission/reception unit 15. In this case, the print data 500 may include the object of the character data and the image data of the respective pages. Additionally, the control unit 10 may acquire the print data 500 from the recording medium (not illustrated) connected to outside. In this case, also, the print data 500 may include the object of the character data and the image data of the respective pages. The control unit 10 saves the acquired print data 500 to the storage unit 19.

Step S402

Next, the control unit 10 performs the color conversion process. The control unit 10 converts the color value in the RGB color space of each object included in the print data 500 into the color value in the CMYK color space, performing the interpolation operation with the color value data 400 of the corresponding interpolated point of the interpolated point data 232 of the color conversion table 230.

Step S403

Next, the control unit 10 performs an output process. The control unit 10 draws the print data 500 with the converted color value and cause the drawing to output by the image forming unit 17. This outputs the page in a state where the color value of the print data 500 in the RGB color space is color-converted into the color value in the CMYK color space. In addition, the control unit 10 may output the combined drawing data by such as creation of PDFs or PS files, record to external recording medium, file transmission to external terminals or servers, or facsimile transmission. Now, the color conversion drawing process according to the embodiment of the disclosure terminates.

With the configuration as described above, the following effects can be obtained. Conventionally, there is provided a technique that can freely change the solid acquired by the grid point to be referred for performing the interpolation of the gamut mapping, however, there is possibility that the interpolation value changes substantially by the shape of the solid and accuracy of the color conversion table 230, which can be created, was lower. In contrast to this, the image forming apparatus 1 according to the embodiment of the disclosure is the image forming apparatus that creates the color conversion table 230, indicating a correspondence relationship between the color value of the first color space and the color value of the second color space. The image forming apparatus 1 includes the interpolation reference data creating unit 100, the reference space coordinate calculating unit 110, and the interpolation operation unit 120. The interpolation reference data creating unit 100, dividing the hue plane with the grid points in the reference space where the first color space is divided into a plurality of the hue planes, creates the interpolation reference data 200, which varies the shape of the triangular shape formed by the grid points for performing the linear interpolation, in the portions where saturation of the hue plane is equal to or less than the predetermined threshold and higher than the predetermined threshold. The reference space coordinate calculating unit 110 calculates the coordinate of the color value of the first color space in the reference space by referring to the interpolation reference data 200 created by the interpolation reference space setting unit. The interpolation operation unit 120 creates the color conversion table 230 by performing the linear interpolation with the coordinates of the triangular shape formed by the grid points in the hue plane adjacent to the coordinates calculated by the reference space coordinate calculating unit 110. With the configuration as described above, when interpolating the interpolated point with respect to the interpolation reference data 200 in the reference space by the linear interpolation, interpolation accuracy can be improved. In view of this, the color conversion table 230 with high accuracy can be created. Additionally, use of the color conversion table 230 ensures performing the color conversion process with high accuracy without performing complicated calculations or holding enormous volume of data.

Furthermore, in the image forming apparatus 1 according to the embodiment of the disclosure, the first color space is the RGB color space and the second color space is the CMYK color space. The interpolation reference data creating unit 100 includes the grid point color value calculating unit 101 which calculates the color value in the CIE LAB color space for the color value in the RGB color space at the grid point and the triangular-shape shape information determining unit 102 which determines the information of the shape of the triangular shape formed by the grid points with the color value in the CIE LAB color space calculated by a color value acquiring unit of the color conversion table 230. The interpolation operation unit 120 includes the tetrahedron dividing unit 122, the tetrahedron inside/outside determining unit 123, and the volume interpolation unit 124. The tetrahedron dividing unit 122 divides the triangular prism formed by the coordinates of the triangular shape formed by the grid points in the adjacent two hue planes into the tetrahedrons. The tetrahedron inside/outside determining unit 123 performs inside/outside determination whether or not the interpolated point of the color conversion table 230 exists inside the tetrahedron for the respective tetrahedrons divided by the tetrahedron dividing unit 122. The volume interpolation unit 124, when the interpolated point is determined to be inside the tetrahedron by the tetrahedron inside/outside determining unit 123, calculates the interpolation value of the color value in the CIE LAB color space of the interpolated point with the volume ratio of the solid formed by the grid points of the tetrahedron and the interpolated point. With the configuration as described above, the color conversion table 230, which can convert from the RGB color space into the CMYK color space with high accuracy, can be created. Further, when performing the color conversion, use of the CIE LAB color space instead of a XYZ color space ensures obtaining the tint as intended. Furthermore, because a selection method of the interpolated point for the color conversion table 230 used for the interpolation is devised, the color value where the value was exactly assumed can be output and the accuracy of the color conversion increases.

Additionally, the image forming apparatus 1 according to the embodiment of the disclosure includes the color conversion unit 130 which converts the color value of the first color space into the color value of the second color space by the created color conversion table 230. With the configuration as described above, the image forming apparatus with improved color conversion accuracy can be provided by the color conversion table 230 with high accuracy. In addition, because the complicated calculations are not necessary, cost for the operation of the color conversion can be reduced.

Other Embodiment

Further, the disclosure is also applicable to a color conversion apparatus other than the image forming apparatus. That is, a possible configuration employs such as a network scanner, the server to which the scanner is additionally connected via USB or a similar interface. In addition, the computer such as a general-purpose PC or the server can be used for the image forming apparatus. Additionally, the color conversion table created by the image forming apparatus can be included in the computer that converts moving images or the device that assigns colors to a display. Furthermore, in the above-described embodiment, the RGB color space and the CMYK color space are described as the color space, other color space may also be used. For example, there may also be the configuration that color-converts the color space where colors are added other than CMYK. With the configuration as described above, the high-accurate color conversion table adjusted to sense of vision of human can be created and used.

Further, in this embodiment, the example was indicated to use one color conversion table 230; however, the color conversion may be performed using two color conversion tables with a former portion and a latter portion. In this case, the interpolation reference data 200 can be used to the color conversion table 230 of the former portion that performs the gamut mapping from the RGB color space to the device independent color space (CIE LAB/CIE LCh or a similar color space). The color value converted into the device independent color space by the color conversion table 230 of the former portion is output, being converted into the device dependent color space (CMYK or a similar space) by the color conversion table 230 of the latter portion side. With the configuration as described above, even when the color conversion apparatus deteriorates with time or the color value changes by replacement of devices or calibrations, the high-accurate color conversion can be performed by separately preparing only the color conversion table of the latter portion. Further, performing the color conversion from the print data, corresponding to the former portion, with the other color conversion table included in an OS of an external PC or similar software, the process, such as converting the color value converted into the CIE LAB color space into the CMYK color space by the latter portion, becomes possible. Furthermore, the color conversion table 230 of the former portion, also, can be easily re-adjusted by changing the predetermined threshold of the CIE C* component.

Additionally, in the aforementioned embodiment, though the interpolated point was equally spaced, it is not limited to this. The interval of the interpolated point may be set unequally based on a design value of color expression of the image forming apparatus 1 or measured values of color recognition of humans or a similar value. Further, in the vicinity of the gray-axis, the detailed color conversion table may be prepared additionally. Thus, the print data which fits to the sense of vision of humans, by performing more accurate color conversion, can be output.

Next, a description will further be given of comparative examples and embodiments of the disclosure based on the drawings, however, the following examples do not limit the disclosure.

Comparative Example 1

Figure 12A:
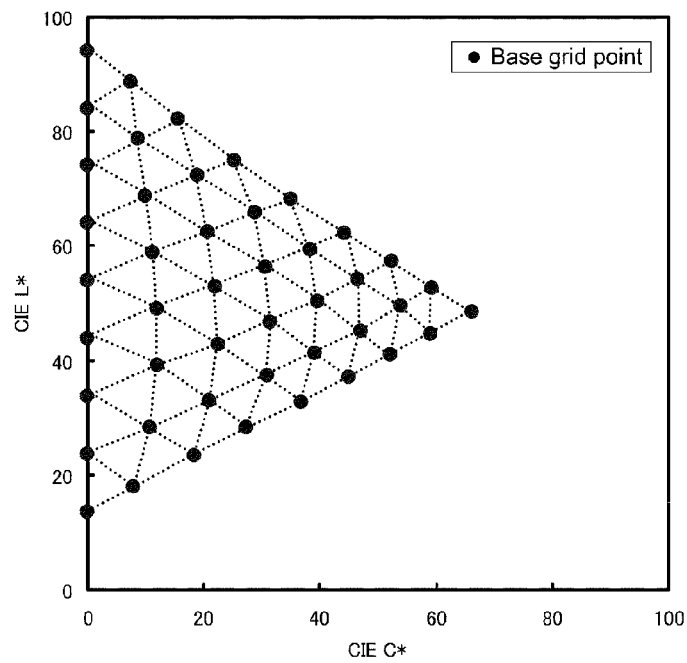
FIGS. 12A and 12B illustrate an interpolation result according to the comparative example 1.
Figure 12B:
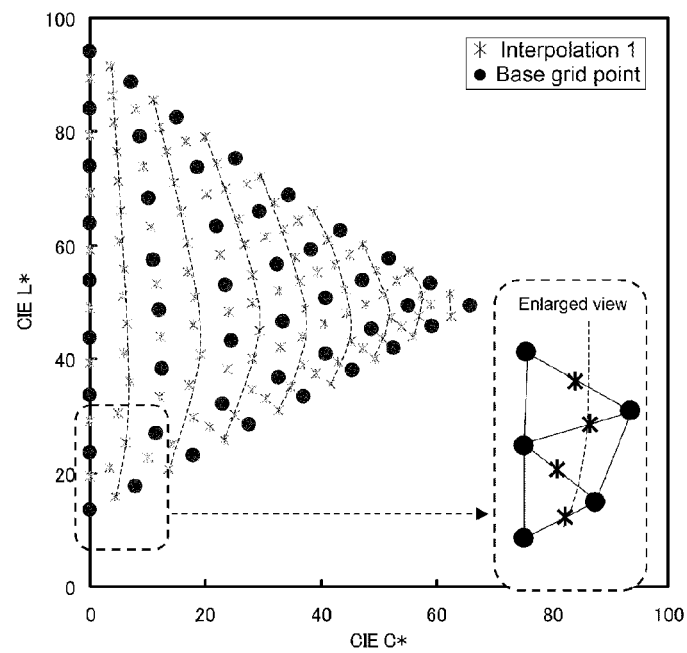

First, a description will be given of a comparative example 1 with reference to FIG. 11 and FIGS. 12A and 12B when the linear interpolation is performed with the shape such as the set of the triangular shape divided by the line segments simply passing through the respective grid points. FIG. 11 conceptually illustrates the hue plane of hue plane data 202 of the comparative example 1 that includes 45 pieces of the grid points created by dividing the hue plane into eight vertically and horizontally respectively and the triangular shape to use for the interpolation. In the comparative example 1, simply, the triangular shape of the shape α and the triangular shape of the shape β inverting the shape α right-and-left are used. FIG. 12A is the example illustrating the hue plane and the grid points with the coordinate system of the CIE C* and the CIE L* in the reference space for the interpolation. FIG. 12A is the example illustrating the hue plane of the comparative example 1 in FIG. 11 with the coordinate system of the CIE LCh by actually assigning the hue plane to the CIE LAB color space. It is known that the hue plane has the triangular shapes where the size and the shape of each triangular shape are different. FIG. 12B illustrates the example that performed the linear interpolation with respect to a middle point of each triangular shape. In the comparative example 1, the linear interpolation was performed so as to interpolate between each triangular shape formed by the grid points, using the XYZ color space of a linear space instead of the CIE LAB color space when calculating by the linear interpolation. The graph illustrates that a horizontal axis is the CIE C* component and a vertical axis is the CIE L* component. Each grid point is indicated with the black circle and the color value (interpolation 1) in the CIE LAB color space after the interpolation is indicated with a sign of "*." Additionally, curves of theoretical values, where the color of each interpolated point in the CIE LAB color space were calculated without performing the linear interpolation, are indicated with dashed lines. It is known that the interpolated color values are varied and not smooth value with reference to an enlarged view of the CIE L* in the lower left and the portion where the CIE C* is lower in the graph.

Comparative Examples 2a, 2b

Figure 13:
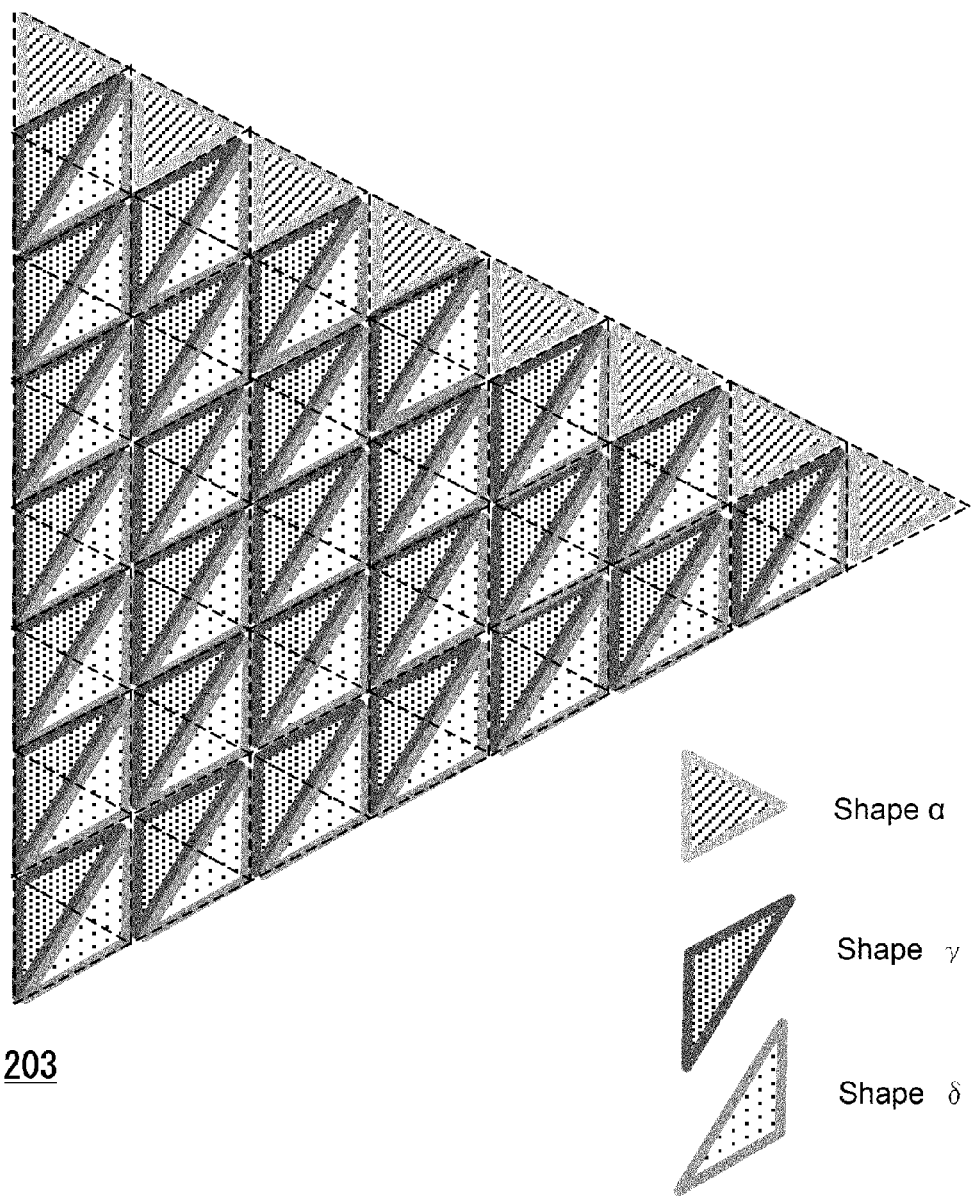
FIG. 13 conceptually illustrates the shape of the triangular shape in the hue plane of comparative embodiments 2a and 2b of the disclosure.
Figure 14A:
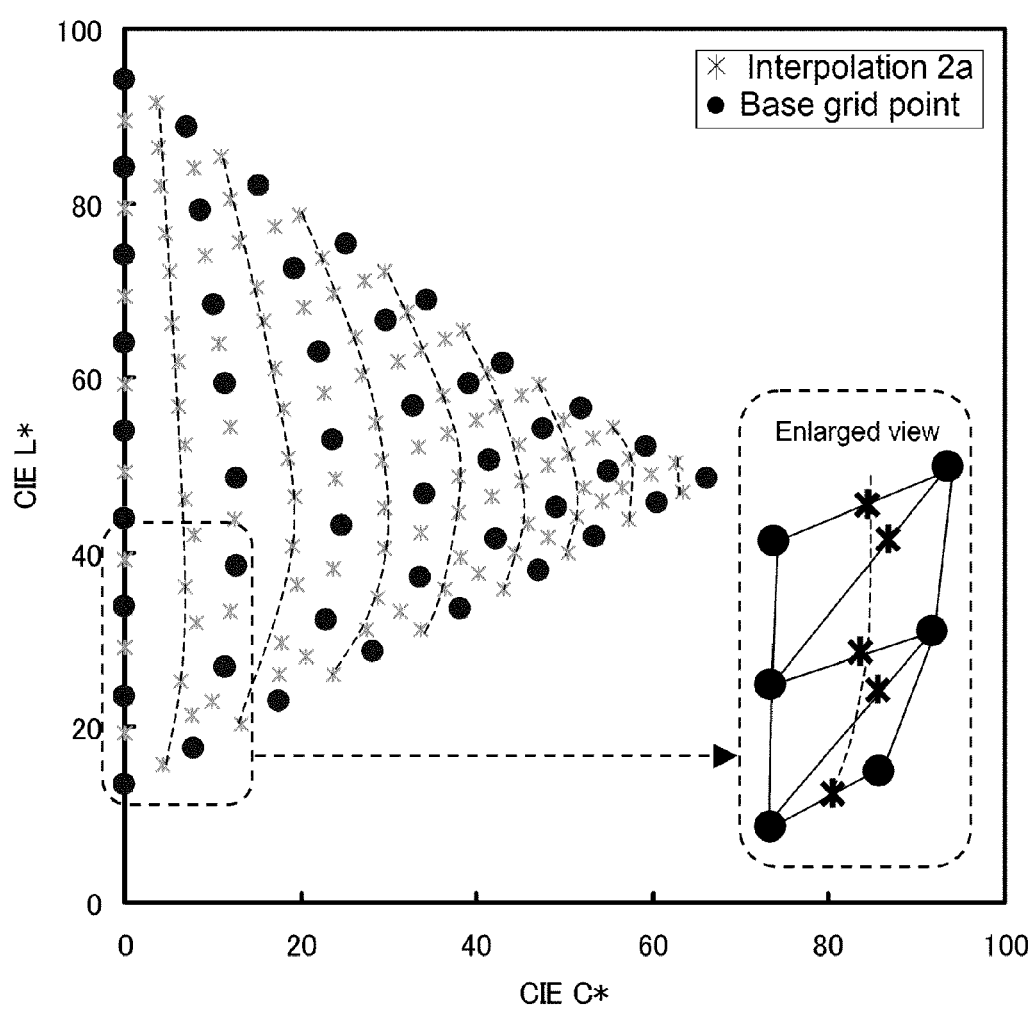
FIGS. 14A and 14B illustrate a graph of the interpolation result of the comparative examples 2a and 2b.
Figure 14B:
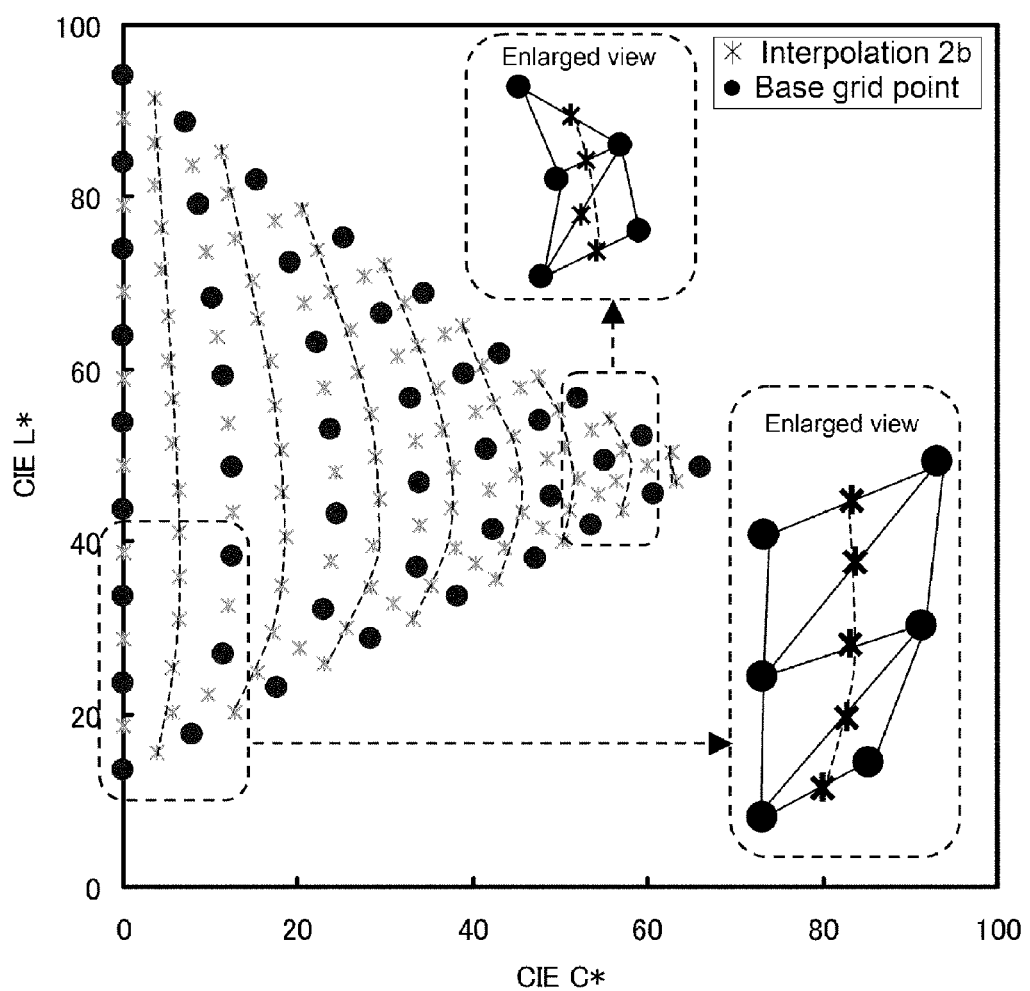

Next, based on FIG. 13 and FIGS. 14A and 14B, a description will be given of a comparative example 2a and a comparative example 2b when the shape of the triangular shape, which is a unit of interpolation, is varied in the entire hue plane. FIG. 13 conceptually illustrates hue plane data 203 where 45 pieces of the grid points are included similar to the comparative example 1 and the shape of the triangular shape are varied as the comparative example 2a and the comparative example 2b. The comparative examples 2a and 2b use a shape γ and a shape δ in the entire hue plane and utilize the shape α only in the end where the shape cannot be varied to the shape γ and the shape δ and saturation is higher. FIG. 14A illustrates the graph of the comparative example 2a, where the linear interpolation operation is performed with respect to the middle point of the triangular shape utilizing the XYZ color space similar to the comparative example 1, with the shape of the triangular shape in FIG. 13. Looking at the enlarged view of this case, also, it is known that interpolation is not performed smoothly similar to the comparative example 1. FIG. 14B illustrates the graph of the comparative example 2b, where the interpolation calculation is performed in the CIE LAB color space instead of the XYZ color space with the shape of the triangular shape in FIG. 13. In this case, it is known that a variation of a Interpolation result is reduced and the shape of the Interpolation result is relatively smooth based on the enlarged view of the CIE L* in the lower left and the portion where the CIE C* is lower in the graph. However, based on the enlarged view of the portion where the CIE C* is higher in the right in the graph, it is known that the variation is eye-catching and the Interpolation result is not smooth.

Embodiment 1

Figure 15:
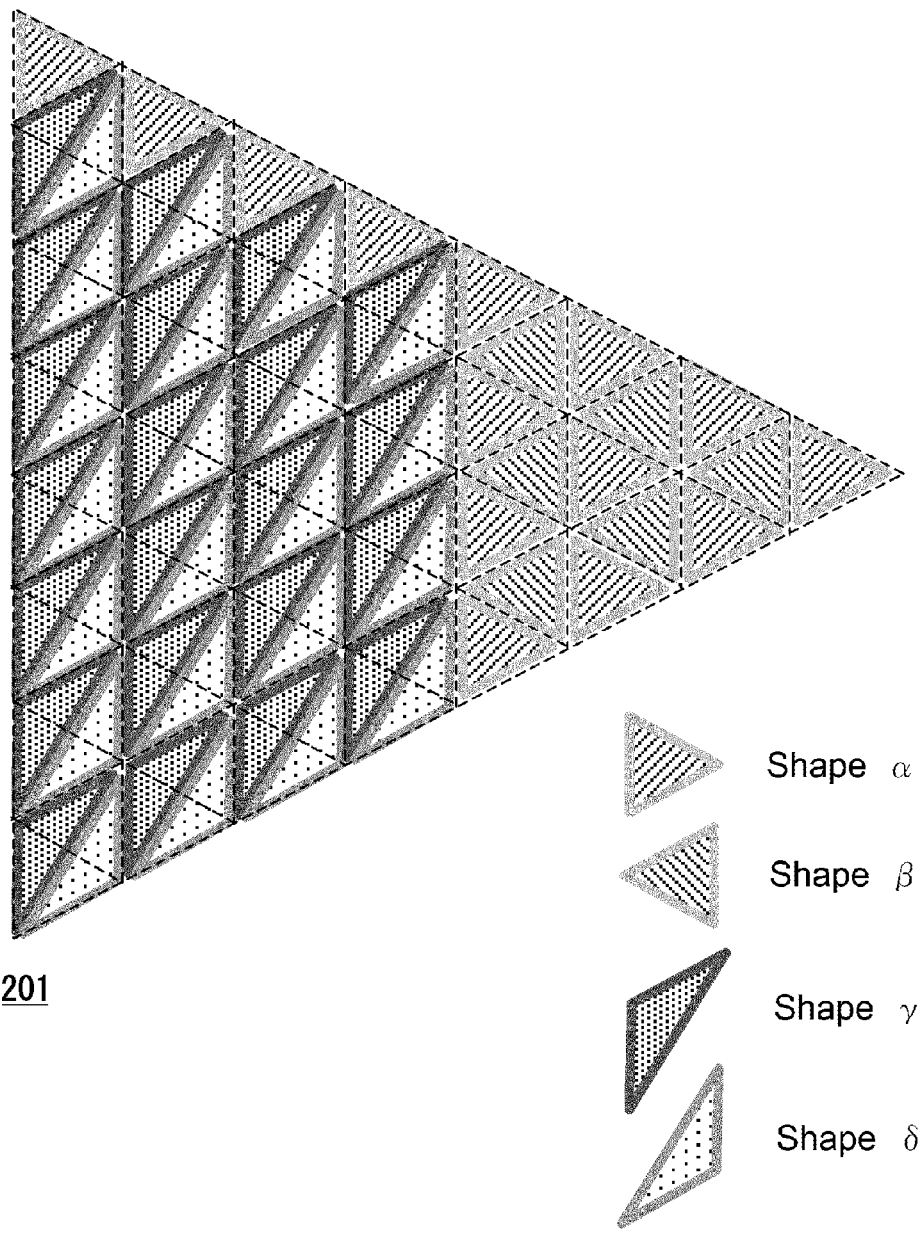
FIG. 15 conceptually illustrates a shape of the triangular shape in the hue plane of a working example 1 of the disclosure.
Figure 16:
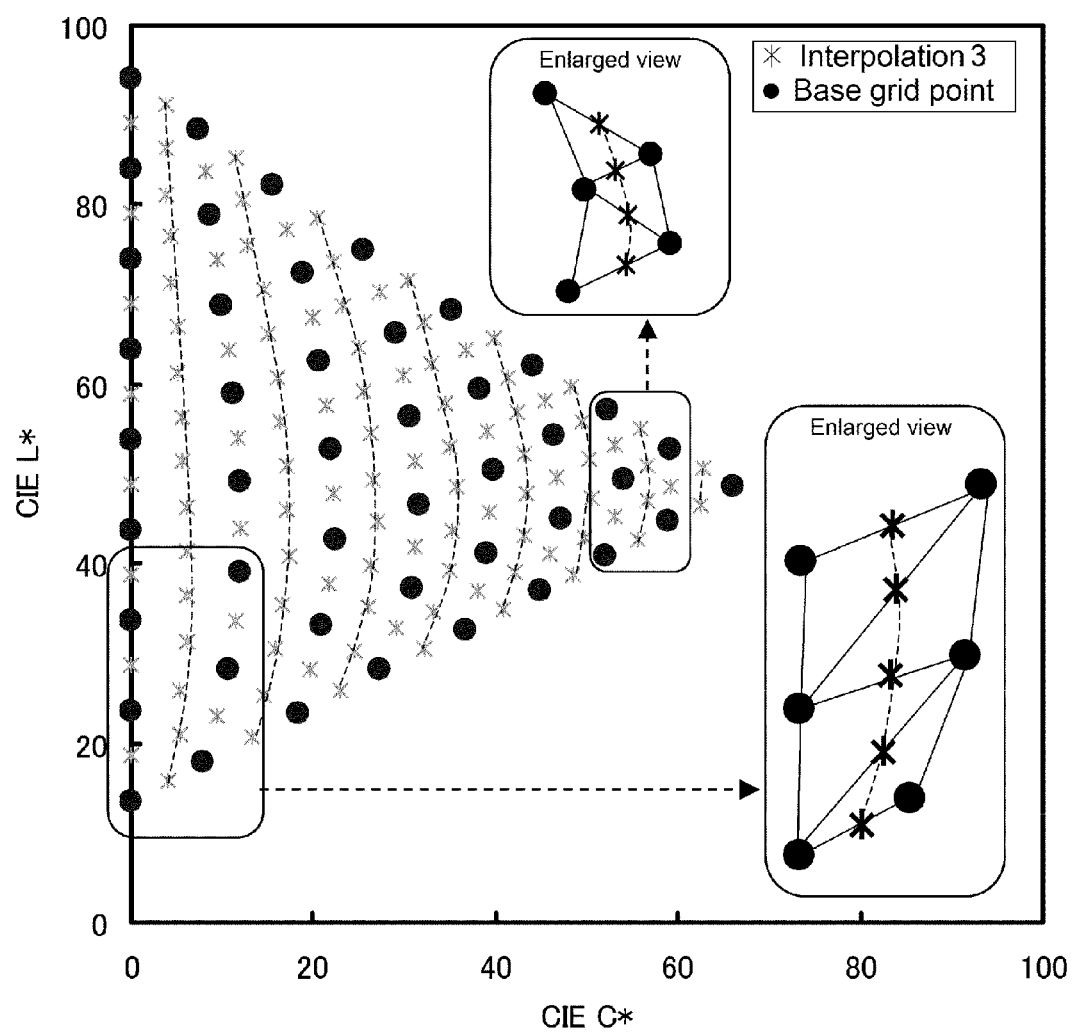
FIG. 16 illustrates a graph of the interpolation result of the working example 1.

Next, a description will be given of an embodiment 1 of the disclosure that varies the shape of the triangular shape in the portion where the CIE C* is lower than the predetermined threshold based on FIG. 15 and FIG. 16. FIG. 15 conceptually illustrates the hue plane data 201 of the embodiment 1. In the embodiment 1, with respect to 45 pieces of the grid points similar to the comparative example 1, and the comparative examples 2a and 2b, the shapes of the triangular shape similar to the comparative examples 2a and 2b are used except in the end of the portion where the CIE C* is lower than the predetermined threshold. That is, interpolation operation is performed using the shape γ and the shape δ in the portion where the CIE C* is equal to or less than the predetermined threshold except in the end, and the shape α and the shape β in the portion where the CIE C* is larger than the predetermined threshold in the hue plane. FIG. 16 illustrates the example when the linear interpolation is performed, with the shape of FIG. 15, with respect to the middle point of each triangular shape in the CIE LAB color space similar to the comparative example 2b. It is known that the variation of the interpolation result is reduced and interpolation is performed smoothly in the portion where the CIE C* is higher and lower.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   an interpolation reference data creating unit that, in a reference space where an RGB color space is divided into a plurality of hue planes, divides the hue planes with grid points, and creates interpolation reference data where triangles formed by the grid points for a linear interpolation are altered in areas where saturation of the hue plane is equal to or less than a predetermined threshold and where the saturation of the hue plane is higher than the predetermined threshold, the RGB color space therein being of color value data from interpolated point data registered in a color conversion table the interpolation reference data creating unit including
      a grid point color value calculating unit that calculates color values in a CIE LAB color space with respect to color values in the RGB color space at the grid points, and
      a triangle shape information determining unit that, using the color values in the CIE LAB color space calculated by the grid point color value calculating unit, determines information as to the shape of the triangles that the grid points form, wherein
         the reference space is calculated by correlating the color values in the RGB color space with the color values in the CIE LAB color space, with coordinates for CIE L* and CIE C* components corresponding to the color values in the CIE LAB color space also being calculated,
         the predetermined threshold indicates a CIE C* threshold referred to in altering the shape of the triangles according to the color values in the CIE LAB color space calculated from the color values in the RGB color space, and
         if a CIE C* component at a grid point is equal to or less than the predetermined threshold, triangle data alteration is performed by replacing the triangle at the grid point, wherein triangles with a vertex at grid points present in a position that is an incrementing or decrementinq by one grid point along the CIE C* and CIE L* components are altered by replacing them with a pairing of triangles having a common apex at the grid point;
   a reference space coordinate calculating unit that refers to the interpolation reference data created by the interpolation reference data creating unit to calculate coordinates in the reference space of the color values in the RGB color space;
   an interpolation operation unit that performs the linear interpolation with the coordinates of the triangles formed by the grid points in the hue plane adjacent to the coordinates calculated by the reference space coordinate calculating unit so as to create the color conversion table, the color conversion table therein indicative of a correspondence relationship between the color values in the RGB color space and the color values in a CMYK color space;
   the interpolation operation unit including
      a tetrahedron dividing unit that divides a triangular prism into tetrahedrons, the triangular prism being formed by the coordinates of the triangles formed by the grid points in adjacent pairs of hue planes,
      a tetrahedron inside/outside determining unit that for each of the tetrahedrons divided by the tetrahedron dividing unit determines whether an interpolated point in the color conversion table is present inside the tetrahedron, and
      a volume interpolation unit that, if an interpolated point is determined to be inside a tetrahedron by the tetrahedron inside/outside determining unit, calculates an interpolation value of the color value for the interpolated point in the CIE LAB color space using a volume ratio of a solid, the solid being formed by the grid points of the tetrahedron and the interpolated point, wherein
      if the interpolated point is present in a hue plane, the interpolation operation unit performs a triangle interpolation value calculating process that includes 1) calculating the triangle in which the interpolated point is present, 2) calculating the color value in the CIE LAB space by performing the linear interpolation based on distances in the reference space from the respective apexes of the triangle to the interpolated point, 3) calculating the color value in the CMYK color space corresponding to the calculated color value in the CIE LAB color space with reference to the color conversion table, and 4) setting the calculated CMYK color-space value as the corresponding color value data for the interpolated point data, and
      if the interpolated point is surrounded by an adjacent pair of hue planes, the interpolation operation unit performs a triangle calculating process that includes 1) drawing perpendicular lines respectively to the two hue planes, 2) calculating the triangles where the hue planes intersect, 3) forming a triangular prism enclosed by the respective triangles in the two hue planes, and 4) setting the triangular prism as the tetrahedron data; and
   a color conversion unit that converts the color values in the RGB color space into the color values in the CMYK color space with the color conversion table.

2. An image forming method, comprising:
   in a reference space where an RGB color space is divided into a plurality of hue planes, dividing the hue planes with grid points;
   creating interpolation reference data where triangles formed by the grid points for a linear interpolation are altered in areas where saturation of the hue plane is equal to or less than a predetermined threshold and where the saturation of the hue plane is higher than the predetermined threshold, the RGB color space therein being of color value data from interpolated point data registered in a color conversion table;

calculating color values in a CIE LAB color space with respect to color values in the RGB color space at the grid points;

determining information as to the shape of the triangles that the grid points form using the calculated color values in the CIE LAB color space; wherein the reference space is calculated by correlating the color values in the RGB color space with the color values in the CIE LAB color space, with coordinates for CIE L* and CIE C* components corresponding to the color values in the CIE LAB color space also being calculated, the predetermined threshold indicates a CIE C* threshold referred to in altering the shape of the triangles according to the color values in the CIE LAB color space calculated from the color values in the RGB color space, and if a CIE C* component at a grid point is equal to or less than the predetermined threshold, triangle data alteration is performed by replacing the triangle at the grid point, wherein triangles with a vertex at grid points present in a position that is an incrementing or decrementinq by one grid point along the CIE C* and CIE L* components are altered by replacing them with a pairing of triangles having a common apex at the grid point;

referring to the created interpolation reference data to calculate coordinates in the reference space of the color values in the RGB color space;

performing the linear interpolation with the coordinates of the triangles formed by the grid points in the hue plane adjacent to the calculated coordinates so as to create the color conversion table, the color conversion table therein indicative of a correspondence relationship between the color values in the RGB color space and the color values in a CMYK color space;

dividing a triangular prism into tetrahedrons, the triangular prism being formed by the coordinates of the triangles formed by the grid points in adjacent pairs of hue planes;

determining for each of the divided tetrahedrons whether an interpolated point in the color conversion table is present inside the tetrahedron;

if an interpolated point is determined to be inside a tetrahedron, calculating an interpolation value of the color value for the interpolated point in the CIE LAB color space using a volume ratio of a solid, the solid being formed by the grid points of the tetrahedron and the interpolated point;

if the interpolated point exists in the hue plane, performing a triangle interpolation value calculating process including 1) calculating the triangle in which the interpolated point is present, 2) calculating the color value in the CIE LAB space by performing the linear interpolation based on distances in the reference space from the respective apexes of the triangle to the interpolated point, 3) calculating the color value in the CMYK color space corresponding to the calculated color value in the CIE LAB color space with reference to the color conversion table, and 4) setting the calculated CMYK color-space value as the corresponding color value data for the interpolated point data;

if the interpolated point is surrounded by an adjacent pair of hue planes performing a triangle calculating process including 1) drawing perpendicular lines respectively to the two hue planes, 2) calculating the triangles where the hue planes intersect, 3) forming a triangular prism enclosed by the respective triangles in the two hue planes, and 4) setting the triangular prism as the tetrahedron data; and converting the color values in the RGB color space into the color values in the CMYK color space with the color conversion table.

3. A non-transitory computer-readable recording medium storing image forming program, the image forming program causing a computer to function as:

an interpolation reference data creating unit that in a reference space where an RGB color space is divided into a plurality of hue planes, divides the hue planes with grid points, and creates interpolation reference data where triangles formed by the grid points for a linear interpolation are altered in areas where saturation of the hue plane is equal to or less than a predetermined threshold and where the saturation of the hue plane is higher than the predetermined threshold, the RGB color space therein being of color value data from interpolated point data registered in a color conversion table the interpolation reference data creating unit including a grid point color value calculating unit that calculates color values in a CIE LAB color space with respect to color values in the RGB color space at the grid points, and a triangle shape information determining unit that, using the color values in the CIE LAB color space calculated by the grid point color value calculating unit, determines information as to the shape of the triangles that the grid points form, wherein the reference space is calculated by correlating the color values in the RGB color space with the color values in the CIE LAB color space, with coordinates for CIE L* and CIE C* components corresponding to the color values in the CIE LAB color space also being calculated, the predetermined threshold indicates a CIE C* threshold referred to in altering the shape of the triangles according to the color values in the CIE LAB color space calculated from the color values in the RGB color space, and if a CIE C* component at a grid point is equal to or less than the predetermined threshold, triangle data alteration is performed by replacing the triangle at the grid point, wherein triangles with a vertex at grid points present in a position that is an incrementing or decrementing by one grid point along the CIE C* and CIE L* components are altered by replacing them with a pairing of triangles having a common apex at the grid point;

a reference space coordinate calculating unit that refers to the interpolation reference data created by the interpolation reference data creating unit to calculate coordinates in the reference space of the color values in the RGB color space;

an interpolation operation unit that performs the linear interpolation with the coordinates of the triangles formed by the grid points in the hue plane adjacent to the coordinates calculated by the reference space coordinate calculating unit so as to create the color conversion table, the color conversion table therein indicative of a correspondence relationship between the color values in the RGB a first color space and the color values in a CMYK color space;

the interpolation operation unit including a tetrahedron dividing unit that divides a triangular prism into tetrahedrons, the triangular prism being formed by the coordinates of the triangles formed by the grid points in adjacent pairs of hue planes, a tetrahedron inside/outside determining unit that for each of the tetrahedrons divided by the tetrahedron dividing unit determines whether an interpolated point in the color conversion table is present inside the tetrahedron, and a volume interpolation unit that, if an interpolated point is determined to be inside a tetrahedron by the tetrahedron inside/outside determining unit, calculates an interpolation value of the color value for the interpolated point in the CIE LAB color space using a volume ratio of a solid, the solid being formed by the grid points of the tetrahedron and the interpolated point, wherein if the interpolated point is present in a hue plane, the interpolation operation unit performs a triangle interpolation value calculating process that includes 1) calculating the triangle in which the interpolated point is present, 2) calculating the color value in the CIE LAB space by performing the linear interpolation based on distances in the reference space from the respective apexes of the triangle to the interpolated point, 3) calculating the color value in the CMYK color space corresponding to the calculated color value in the CIE LAB color space with reference to the color conversion table, and 4) setting the calculated CMYK color-space value as the corresponding color value data for the interpolated point data, and if the interpolated point is surrounded by an adjacent pair of hue planes, the interpolation operation unit performs a triangle calculating process that includes 1) drawing perpendicular lines respectively to the two hue planes, 2) calculating the triangles where the hue planes intersect, 3) forming a triangular prism enclosed by the respective triangles in the two hue planes, and 4) setting the triangular prism as the tetrahedron data; and a color conversion unit that converts the color values in the RGB color space into the color values in the CMYK color space with the color conversion table.

* * * * *